United States Patent
Polli et al.

(10) Patent No.: US 9,842,314 B2
(45) Date of Patent: Dec. 12, 2017

(54) SYSTEMS AND METHODS FOR DATA-DRIVEN IDENTIFICATION OF TALENT

(71) Applicant: Pymetrics, Inc., New York, NY (US)

(72) Inventors: Frida Polli, New York, NY (US); Julie Yoo, New York, NY (US)

(73) Assignee: PYMETRICS, INC., New York, NY (US)

( * ) Notice: Subject to any disclaimer, the term of this patent is extended or adjusted under 35 U.S.C. 154(b) by 0 days.

(21) Appl. No.: 15/181,322

(22) Filed: Jun. 13, 2016

(65) Prior Publication Data

US 2016/0292645 A1   Oct. 6, 2016

Related U.S. Application Data

(63) Continuation of application No. 14/751,943, filed on Jun. 26, 2015.
(Continued)

(51) Int. Cl.
| | | |
|---|---|---|
| *G06Q 10/00* | (2012.01) | |
| *G06Q 10/10* | (2012.01) | |
| *G06Q 10/06* | (2012.01) | |
| *A63F 13/25* | (2014.01) | |
| *A63F 13/822* | (2014.01) | |

(Continued)

(52) U.S. Cl.
CPC ......... *G06Q 10/1053* (2013.01); *A63F 13/25* (2014.09); *A63F 13/822* (2014.09); *G06Q 10/06398* (2013.01); *G06Q 10/063112* (2013.01); *G09B 7/02* (2013.01); *G09B 7/06* (2013.01)

(58) Field of Classification Search
CPC .... G06Q 30/02; G06Q 10/06; G06Q 30/0601; G06Q 10/063; G06Q 10/06315; G06Q 10/06375; G06Q 10/087; G06Q 20/203; G06Q 30/0202; G06Q 30/0256; G06Q 30/0261; G06Q 30/0269; G06Q 30/0633; G06Q 50/12; G06Q 10/063112; G06Q 10/06398; G06Q 10/1053
USPC ............................................... 705/7.42, 7.38
See application file for complete search history.

(56) References Cited

U.S. PATENT DOCUMENTS

| | | | |
|---|---|---|---|
| 7,751,878 B1 * | 7/2010 | Merkle | ..................... A61B 5/04 600/544 |
| 8,628,331 B1 * | 1/2014 | Wright | ................... G09B 19/00 434/107 |

(Continued)

OTHER PUBLICATIONS

White; et al., "Test-Retest Characteristics of the Balloon Analogue Risk Task (BART). Experimental and Clinical Psychopharmacology, 2008, vol. 1, No. 6, 565-570."*
(Continued)

*Primary Examiner* — Jamie Austin
(74) *Attorney, Agent, or Firm* — Wilson Sonsini Goodrich & Rosati

(57) ABSTRACT

The present disclosure describes a talent-identification system that can be used by companies to assist in the recruitment process for new employees. Additionally, the system can be used by job seekers to determine ideal career fields and industries. The system employs an array of neuroscience-based tests to assess a user's career propensities, after which the system can provide career recommendations to the user or report on employment suitability of the user to a company.

19 Claims, 8 Drawing Sheets

Related U.S. Application Data

(60) Provisional application No. 62/101,524, filed on Jan. 9, 2015, provisional application No. 62/018,459, filed on Jun. 27, 2014.

(51) Int. Cl.
*G09B 7/02* (2006.01)
*G09B 7/06* (2006.01)

(56) References Cited

U.S. PATENT DOCUMENTS

| | | | |
|---|---|---|---|
| 2004/0083195 A1* | 4/2004 | McCord | H04M 3/5233 706/47 |
| 2006/0036153 A1* | 2/2006 | Laken | A61B 5/0476 600/410 |
| 2007/0143167 A1 | 6/2007 | Cohen et al. | |
| 2007/0185757 A1 | 8/2007 | Subramanian | |
| 2008/0003553 A1* | 1/2008 | Stark | G09B 5/00 434/236 |
| 2009/0157482 A1* | 6/2009 | Jung | A61B 5/04842 705/7.33 |
| 2010/0010317 A1* | 1/2010 | De Lemos | A61B 3/113 600/300 |
| 2010/0100496 A1 | 4/2010 | Baldwin et al. | |
| 2012/0023031 A1* | 1/2012 | Galya | G06Q 10/1053 705/321 |
| 2012/0075119 A1* | 3/2012 | Dorneich | G06Q 10/06 340/945 |
| 2012/0214143 A1* | 8/2012 | Severson | G06F 19/3431 434/236 |
| 2012/0258436 A1 | 10/2012 | Lee | |
| 2013/0101976 A1* | 4/2013 | Roots | G09B 5/06 434/362 |
| 2013/0185218 A1 | 7/2013 | Hermsdorff et al. | |
| 2013/0216986 A1* | 8/2013 | Goldman | G09B 19/00 434/236 |
| 2013/0260357 A1* | 10/2013 | Reinerman-Jones | G06Q 10/1053 434/362 |
| 2013/0290207 A1* | 10/2013 | Bonmassar | G06Q 10/06 705/321 |
| 2014/0107429 A1* | 4/2014 | Simkovich | A61B 5/16 600/300 |
| 2014/0317079 A1* | 10/2014 | Obernikhin | G06F 17/30542 707/706 |
| 2014/0351156 A1* | 11/2014 | Orban | G06Q 10/1053 705/321 |
| 2015/0079578 A1* | 3/2015 | Nardi | A61B 5/16 434/362 |
| 2015/0379454 A1 | 12/2015 | Polli et al. | |

OTHER PUBLICATIONS

Abdel-Khalek A., "Egyptian Results on the Standard Progressive Matrices Person. Individ. Diff. vol. 9, No. 1, pp. 193-195, 1988.".
Amanatullah; et al., "Negotiators Who Give Too Much: Unmitigated Comunion, Relational Anxieties, and Economic Costs in Distributive and Integrative Bargaining. Journal of Personality and Social Psychology, 2008, vol. 95, No. 3, 723-738.".
Amengual; et al., "Tracking Post-Error Adaptation in the Motor System by Transcranial Magnetic Stimulation. Neuroscience 250 (2013): 342-351.".
Austin; et al., "Measuring Motor Speed Through Typing: A Surrogate for the Finger Tapping Test. Behav Res Methods. Dec. 2011; 43(4): 903-909.".
Baker; et al., "Delay Discounting in Current and Never-Before Cigarette Smokers: Similarities and Differences Across Commodity, Sign, and Magnitude. Journal of Abnormal Psychology, 2003, vol. 112, No. 3, 382-392.".
Baron-Cohen et al., "Another Advanced Test of Theory of Mind: Evidence from Very High Functioning Adults with Autism or Asperger Syndrome. J. Child Psychol. Psychiat. vol. 38, No. 7, pp. 813-822, 1997.".
Beck; et al., "Test-Retest Reliability of a Group-Administered Paper-Pencil Measure of Delay Discounting. Experimental and Clinical Psychopharmacology, 2009, vol. 17, No. 5, 345-355.".
Bekkers; R., "Measuring Altruistic Behavior in Surveys: The All-or-Nothing Dictator Game. Survey Research Methods (2007), vol. 1, No. 3, pp. 139-144.".
Berg; et al., "Trust, Reciprocity, and Social History. Games and Economic Behavior 10, 122-142 (1995).".
Bogdan; et al., "Corticotropin-Releasing Hormone Receptor Type 1 (CRHR1) Genetic Variation and Stress Interact to Influence Reward Learning. J Neurosci. Sep. 14, 2011; 31(37): 13246-13254.".
Bornstein; et al., "Short-Term Retest Reliability of the Halstead-Reitan Battery in a Normal Sample. The Journal of Nervous and Mental Disease, vol. 175, No. 4, 229-232.".
Bors; et al., "Raven's Advanced Progressive Matrices: Norms for First-Year University Students and the Development of a Short Form. Educational and Psychological Measurement, vol. 58, No. 3, Jun. 1998, 382-398.".
Carroll; et al., "Do Facial Expression Signal Specific Emotions? Judging Emotion From the Face in Context. Journal of Personality and Social Psychology, 1996, vol. 70, No. 2, 205-218.".
Dikmen; et al., "Test-Retest Reliability and Practice Effects of Expanded Halstead-Reitan Neuropsychological Test Battery. Journal of the International Neuropsychological Society (1999), 5, 346-356.".
Eckardt; et al., "Test-Retest Reliability of the Halstead Impairment Index in Hospitalized Alcoholic and Nonalcoholic Males with Mild to Moderate Neuropsychological Impairment. Journal of Clinical Neuropsychology, 3:3, 257-269.".
Engel; C., "Dictator Games: A Meta Study. Preprints of the Max Planck Institute for Research on Collective Goods, Mar. 2010, pp. 1-43.".
Fan; et al., "Assessing the Heritability of Attentional Networks. BMC Neuroscience 2001,2:14.".
Fan; et al., "Testing the Efficiency and Independence of Attentional Networks. Journal of Cognitive Neuroscience, 14:3, pp. 340-347.".
Gevins; et al., "Neurophysiological Measures of Working Memory and Individual Differences in Cognitive Ability and Cognitive Style. Cerebral Cortex Sep. 2000; 10:829-839.".
Gnys; et al., "Validation of Executive Function Tasks With Young Children. Developmental Neuropsychology, 1991, 7(4), 487-501.".
Golafshani; N., "Understanding Reliability and Validity in Qualitative Research. The Qualitative Report, vol. 8, No. 4, Dec. 2003, 597-607.".
Green; et al., "Connecting Long Distance: Semantic Distance in Analogical Reasoning Modulates Frontopolar Cortex Activity. Cerebral Cortex, Jan. 2010; 20: 70-76.".
Green; et al., "Neural Correlates of Creativity in Analogical Reasoning. Journal of Experimental Psychology: Learning, Memory, and Cognition. 2012, vol. 38, No. 2, 264-272.".
Green; et al., "The Micro-Category Account of Analogy. Cognition 106 (2008): 1004-1016.".
Green; et al., "Using Genetic Data in Cognitive Neuroscience: From Growing Pains to Genuine Insights. Nature Reviews, Neuroscience, vol. 9, Sep. 2008, 710-720.".
Gualtieri; et al., "Reliability and Validity of a Computerized Neurocognitive Test Battery, CNS Vital Signs. Archives of Clinical Neuropsychology 21 (2006): 623-643.".
Gunnthorsdottir; et al., "Using the MAchiavellianism Instrument to Predict Trustworthiness in a Bargaining Game. Journal of Economic Psychology, 23 (2002): 49-66.".
Hahn; et al., "Test-retest Reliability of Attention Network Test Measures in Schizophrenia. Schizophrenia Research 133 (2011): 218-222.".
Hallerback; et al., "The Reading the Mind in the Eyes Test: Test-retest reliability of a Swedish version. Cognitive Neuropsychiatry, 2009 14(2): 127-143.".
Hockey; et al., "The Concurrent Validity and Test-Retest Reliability of a Visuospatial Working Memory Task. Intelligence 32 (2004): 591-605.".

(56) References Cited

OTHER PUBLICATIONS

International search report and written opinion dated Sep. 15, 2015 for PCT/US2015/038162.
Jaeggi; et al., "The Concurrent Validity of the N-back Task as a Working Memory Treasure. Memory, 2010, 18 (4): 394-412.".
John; et al., "Measurement: Reliability, Construct Validation, and Scale Construction. Handbook of Research Methods in Social and Personality Psychology, edited by H.T. Reis and C.M. Judd. New York: Cambridge University Press, 2000, pp. 339-369.".
Johnson; et al., "Trust Games: A Meta-Analysis. Journal of Economic Psychology, 32 (2011): 865-889.".
Kalbfleisch; et al., "The Influences of Task Difficulty and Response Correctness on Neural Systems Supporting Fluid Reasoning. Cogn. Neurodyn. (2007), 1: 71-84.".
Kaller; et al., "Assessing Planning Ability With the Tower of London Task: Psychometric Properties of a Structurally Balanced Problem Set. Psychological Assessment, 2012, vol. 24, No. 1, 46-53.".
Kindlon; et al., "Psychometric Properties of Impulsivity Measures: Temporal Stability, Validity, and Factor Structure. J. Child Psychol., vol. 36, No. 4, pp. 645-651, 1995.".
King-Casas et al., "Getting to Know You: Reputation and Trust in a Two-Person Economic Exchange. Science, New Series, vol. 308, No. 5718 (Apr. 1, 2005), pp. 7883.".
Kirby; et al., "Modeling Myopic Decisions: Evidence for Hyperbolic Delay-Discounting within Subjects and Amounts. Organizational Behavior and Human Decision Processes, vol. 64, No. 1, Oct., pp. 22-30, 1995.".
Krueger; et al., "Neural Correlates of Trust. PNAS, Dec. 11, 2007, vol. 104, No. 50, pp. 20084-20089.".
Kuntsi; et al., "Testing Assumptions for Endophenotype Studies in ADHD: Reliability and Validity of Tasks in a General Population Sample. BMC Pssychiatry, Nov. 1, 2005; 5:40.".
Langenecker; et al., "A Task to Manipulate Attentional Load, Set-Shifting, and Inhibitory Control: Convergent Validity and Test-Retest Reliability of the Parametric Go/No-Go Test. Journal of Clinical and Experimental Neuropsychology, 2007, 29(8): 842-853.".
Lejuez; et al., "Evaluation of a Behavioral Measure of Risk Taking: The Balloon Analogue Risk Task (BART). Journal of Experimental Psychology: Applied. 2002, vol. 8, No. 2, pp. 75-84.".
Lejuez; et al., "Reliability and Valididty of the Youth Version of the Balloon Analogue Risk Taks (BART-Y) in the Assessment of Risk-Taking Behavior Among Inner-City Adolescents. Journal of Clinical Child and Adolescent Psychology, 2007, vol. 36, No. 1, 106-111.".
Lemay; et al., "Practice Effect and Test-Retest Reliability of Attentional and Executive Tests in Middle-Aged to Elderly Subjects. The Clinical Nueropsychologist, 2004, vol. 18, No. 2, pp. 284-302.".
Mills; et al., "The Raven's Progressive Matrices: Its Usefulness for Identifying Gifted/Talented Students. Roeper Review, 1993, 15:3, 183-186.".
Mishra; et al., "Gambling as a Form of Risk-Taking: Individual Differences in Personality, Risk-Accepting Attitudes, and Behavioral Preferences for Risk. Personality and Individual Differences, 49 (2010): 616-621.".
Mishra; et al., "Individual Differences in Risk-Propensity: Associations Between Personality and Behavioral Measures of Risk. Personality and Individual Differences, 50 (2011): 869-873.".
Ohmura; et al., "Three-Month Stability of Delay and Probability Discounting Measures. Experimental and Clinical Psychopharmacology, 2006, vol. 14, No. 3, 318-328.".

Pizzagalli; et al., "Reduced Hedonic Capacity in Major Depressive Disorder: Evidence from a Probalistic Reward Task. J. Psychiatr. Res. Nov. 2008; 43(1): 76-87.".
Pizzagalli; et al., "Single Dose of a Dopaine Agonist Impairs Reinforcement Learning in Humans: Behavioral Evidence From a Laboratory-Based Measure of Reward Responsiveness. Psychopharmacology (2008), 196: 221-232.".
Pizzagalli; et al., "Toward an Objective Characterization of an Anhedonic Phenotype: A Signal-Detection Approach. Biol Psychiatry 2005; 57:319-327.".
Rooney; et al., "Methodology is Destiny: The Effect of Survey Prompts on Reported Levels of Giving and Volunteering. Nonprofit and Voluntary Sector Quarterly, vol. 33, No. 4, Dec. 2004, 628-654.".
Ruff; et al., "Gender and Age-Specific Changes in Motor Speed and Eye-Hand Coordination in Adults: Normative Values for the Finger Tapping and Grooved Pegboard Tests. Perceptual and Motor Skills, 1993, 76, 1219-1230.".
Sakong; et al., "Evaluation of Reliability of Traditional and Computerized Neurobehavioral Tests. NeuroToxicology 28, (2007): 235-239.".
Salinsky; et al., "Test-Retest Bias, Reliability, and Regression Equations for Neuropsychological Measure Repeated Over a 12-16-Week Period. Journal of the International Neuropsychological Society (2001), 7, 597-605.".
Salthouse; et al., "Decomposing Adult Age Differences in Working Memory. Developmental Psychology, 1991, vol. 27, No. 5, 763-776.".
Schnirman; et al., "Development of the Tower of London-Revised. Assessment, 1998, vol. 5, No. 4, 335-360.".
Schroder; et al., "When the Rules are Reversed: Action-Monitoring Consequences of Reversing Stimulus-Response Mappings. Cogn. Affect Behav. Neurosci. (2012), 12: 629-643.".
Simpson; et al., "Reliability of a Measure of Temporal Discounting. The Pyschological Record, 2000, 50, 3-16.".
Smith; et al., "Methodological Considerations in the Study of Delay Discounting in Intertemporal Choice: A Comparison of Tasks and Modes. Behavior Research Methods, 2008, 40(4): 940-953.".
Sullivan; et al., "Concurrent Validity of the Tower Tasks as Measures of Executive Function in Adults: A Meta-Analysis. Applied Neuropsychology, 16: 62-75, 2009.".
Summary of the Standards for Educational and Psychological Testing, Appendix F. California State Personnel Board Merit Selection Manual: Policy and Practices. Oct. 2003. 11 pages.
Treadway; et al., "Worth the 'EEfRT'? The Effort Expenditure for Rewards Task as an Objective Measure of Motivation and Anhedonia. PLoS One, Aug. 2009, vol. 4, Issue 8, e6598.".
Umebayashi; et al., "An ERP Investigation of Task Switching Using a Flanker Paradigm. Brain Research 1346 (2010): 165-173.".
Van; Bochove et al., "Blinking Predicts Enhanced Cognitive Control. Cogn. Affect Behav. Neurosci. (2013), 13: 346-354.".
White; et al., "Test-Retest Characteristics of the Balloon Analogue Risk Task (BART). Experimental and Clinical Psychopharmacology, 2008, vol. 1, No. 6, 565-570.".
Williams; et al., "The Test-Retest Reliability of a Standardized Neurocognitive and Neurophysiological Test Battery: "Neuromaker". Intern. J. Neuroscience, 155: 1605-1630, 2005.".
Yildirim; et al., "Investigation of the Reliability of the "Reading the Mind in the Eyes Test" in a Turkish Population. Turkish Journal of Psychiatry 2011; 22: 1-8.".
Zak; et al., "Oxytocin is Associated with Human Trustworthiness. Hormones and Behavior 48 (2005): 522-527.".
Zook; et al., "Performance of Healthy, Older Adults on the Tower of Long-Revised: Associations with Verbal and Nonverbal Abilities. Aging, Neuropsychology, and Cognition, 13:1-19, 2006.".

* cited by examiner

SYSTEMS AND METHODS FOR DATA-DRIVEN IDENTIFICATION OF TALENT

CROSS REFERENCE

This application is a continuation application of U.S. patent application Ser. No. 14/751,943, filed on Jun. 26, 2015, which application claims the benefit of U.S. Provisional Patent Application No. 62/101,524, filed on Jan. 9, 2015, and U.S. Provisional Patent Application No. 62/018,459, filed on Jun. 27, 2014, the content of each of which is incorporated herein by reference in their entirety.

BACKGROUND

Recruiting suitable candidates for a position can be a challenging task for companies. Generally, companies can rely on recruiters and interviews to determine if an applicant would be an ideal fit for their team. However, finding new employees can be a time-consuming, costly, and, in some cases, futile process, especially if the pool of applicants is large. Conversely, determining a suitable career path can be a daunting task for new job-seekers, and existing job search resources are often not tailored to an individual. A platform to find an ideal employee or job, based on a desired characteristic profile, remains unavailable.

SUMMARY OF THE INVENTION

In some embodiments, the invention provides a computer program product comprising a computer-readable medium having computer-executable code encoded therein, the computer-executable code adapted to be executed to implement a method comprising: a) providing a recruitment system, wherein the recruitment system comprises: i) a task module; ii) a measurement module; iii) an assessment module; and iv) an identification module; b) providing by the task module a computerized task to a subject; c) measuring by the measurement module a performance value demonstrated by the subject in performance of the task; d) assessing by the assessment module a trait of the subject based on the measured performance value; and e) identifying to a hiring officer by the identification module based on the assessed trait that the subject is suitable for hiring by an entity.

In some embodiments, the invention provides a computer program product comprising a computer-readable medium having computer-executable code encoded therein, the computer-executable code adapted to be executed to implement a method comprising: a) providing a talent identification system, wherein the talent identification system comprises: i) a task module; ii) a measurement module; iii) an assessment module; iv) an identification module; and v) an output module; b) providing by the task module a computerized task to a subject; c) measuring by the measurement module a performance value demonstrated by the subject in performance of a task; d) assessing by the assessment module a trait of the subject based on the measured performance value; e) identifying by the identification module a career propensity based on the assessing of the trait of subject; and f) outputting by the output module the identified career propensity to a hiring officer.

In some embodiments, the invention provides a method comprising: a) providing a computerized task to a subject; b) measuring a performance value demonstrated by the subject in performance of the task; c) assessing a trait of the subject based on the performance value; d) comparing by a processor of a computer system the trait of the subject with a database of test subjects; e) determining based on the comparing that the subject is suitable for hiring by an entity; and f) reporting to a hiring officer at the entity that the subject is suitable for hiring.

In some embodiments, the invention provides a method comprising: a) providing a computerized task to a subject; b) measuring a performance value demonstrated by the subject in performance of the task; c) assessing a trait of the subject based on the performance value; d) identifying by a processor of a computer system a career propensity of the subject based on a comparison of the assessed trait of the subject with a database of test subjects; and e) outputting a result of the comparison to a hiring officer.

DETAILED DESCRIPTION

Figure 1:
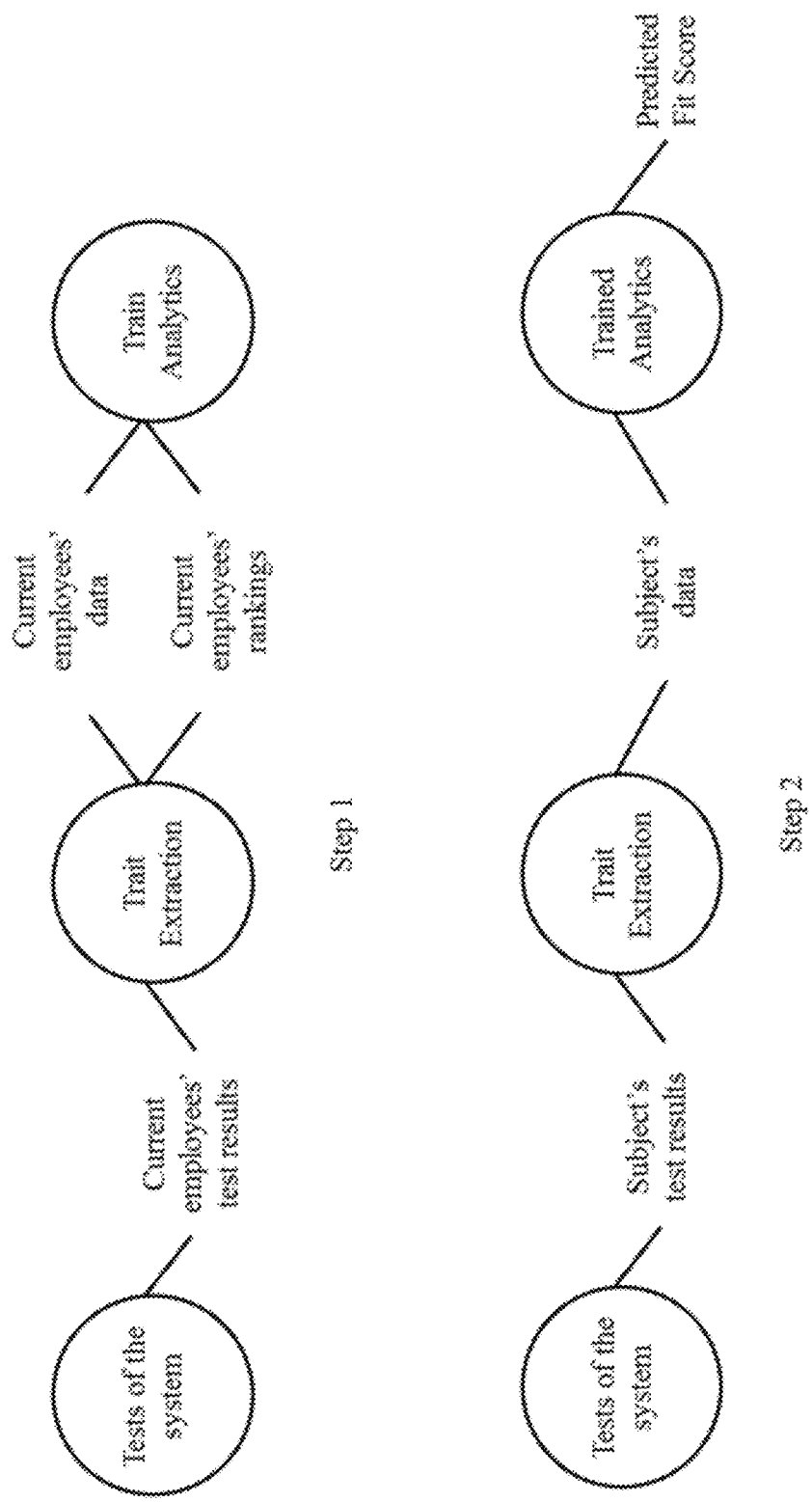
FIG. 1 depicts an overview of a modeling system of the invention.

Companies often rely on inefficient recruiting practices, which can lead to the hiring of weak applicants, and ultimately, lower employee retention. Further, because the recruiting process can be expensive, employers can be reluctant to acquire new talent. This reluctance can lead to company stagnation and to the departure of top employees to pursue better opportunities. Thus, companies are faced with the difficult task of cost-effective, but accurate hiring. Conversely, new graduates or job seekers face challenges in finding a career that is most suited to their talents and inclinations not only owing to an unpredictable job market, but also to the difficulty of initially determining what career path to pursue.

A system of the present invention can be used by companies to identify talent that is tailored to the company's needs for a specific position. The system can use neuroscience-based tasks to optimize the company's recruiting and candidate sourcing process. In addition to being a useful recruiting tool for companies, the system can also assist individuals in career-planning and talent identification. By using tests that measure a wide array of emotional and cognitive traits, the system can ascertain the strengths and weaknesses of a user and apply that information to determine what industry is best matched for the user.

A system of the present invention can use performance-based games to collect information about a person's cognitive and emotional traits. The system can create an employee profile for a specific company by evaluating current employee performance on the neuroscience tests. The results of the neuroscience tests, in combination with performance data of the employee from the company, can be used to create an ideal employee model. Candidates can then be asked to complete the same tasks, and the candidates' results can be compared to those of current employees to determine suitability for a specific position. Candidates can also be compared across multiple positions to ascertain which position, if any, is suitable based on the profile created by the system.

Methods of a System of the Invention.

A wide range of rigorous methods can be used by a system of the invention to discover pertinent information for predicting factors about subjects that are of interest to a company. The system's assessment can comprise collecting objective data using the system's assessment module, and then modeling learning behavior dynamics. A strength of modeling learning behavior dynamics is that instead of examining behavior with a static score, for example, the average score, the system can instead examine behavior over time. This method can allow the system to ascertain metrics of learning, for example, how test takers learn from errors or how rewards affect the test-takers' learning. These metrics of learning are often neglected in human capital analytics, but can be valuable in determining important employee characteristics.

The system can use scores generated by the individual assessments within the system to create a fit score for a subject. The fit score can be an aggregation of the scores of the individual tasks. The fit score can range from 0-100% and predict the likelihood that a subject would be suitable for a specific position or career industry. A fit score can be, for example, about 0%, about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 60%, about 70%, about 80%, about 90%, or about 100%.

Prior to performing prediction analyses, the system can quantify the relationships in existing data, and the quantification can identify the main features of the data and provide a summary of the data. For example, before the system can predict whether a particular candidate can succeed at a specific company as a management consultant, the system can build a descriptive model of the relationship between the current employees' traits and their success as management consultants. The system's analytics engine can implement various data mining and clustering algorithms for unsupervised classification to generate these descriptive models. To create descriptive models, the system can take assessment data from current employees and correlate the data with ratings of the employees provided to the system by the company. These ratings can be objective metrics, such as those used in performance reviews, and of particular interest to the company.

FIG. 1 is an overview of how an analytics engine of the system can be used as a predictive model for a business entity attempting to predict how likely a potential hire will succeed as an employee. In the first step, a current employee can complete the tests of the system. Upon completion of the tests, the system can extract cognitive and emotional trait data based on the performance of the employee on the tests. Next, the system can use the employee's rating data and test data to train the analytics engine to determine what characteristics an ideal employee should possess for a specific position at the business entity.

Once the analytics engine is adequately trained, the model can be used in the second step for predictive analysis and forecasting. First, the candidate can complete the system's tests. Upon completion, the system can extract traits about the candidate based upon the candidate's performance on the tests. The data from the tests can then be applied to the trained analytics engine to create a fit score for the candidate. These predictive models can be used to assess factors including, for example, how likely a potential hire would be to succeed in a particular role at the company. Accurate predictive models can detect subtle data patterns to answer questions about an employee's future performance in order to guide employers to optimize their human capital.

A system of the invention can provide a method of providing a computerized task to a subject. The task can be a neuroscience-based assessment of emotion or cognition. Upon completion of the tasks, the system can measure a performance value of the subject based on the subject's performance on the task. A specific trait can then be assessed based on the performance value, wherein the assessed trait can be used to create a profile for the subject. The trait can then be compared by a processor of a computer system with a database of test subjects. Comparison of the traits of the subject with a database of test subject can be used to create a model specific to the tested subject. The model can be then used to score the subjects, which can assist in creating a quantitative assessment of the subject's emotion or cognition. The test subjects can work for a business entity. The comparison of the trait of the subject with the database of test subjects can be used to determine whether the subject is suitable for hiring.

A system of the invention can provide a method of providing a computerized task to a subject. The task can be a neuroscience-based assessment of emotion or cognition. Upon completion of the tasks, the system can measure a performance value of the subject based on the subject's performance on the task. A specific trait can then be assessed based on the performance value, wherein the assessed trait can be used to create a profile for the subject. The assessed trait can further be used to generate a model of the subject based on assessment of more than one trait of the subject and comparison of the subject's model and a reference model. A processor of a computer system can then be used to identify the subject's career propensity based on a comparison of the subject's trait with a database of test subjects. The comparison of the subject's trait with a database of test subjects can also be used to generate a model of the subject. The results of the comparison can be outputted to a hiring officer. The results of the comparison can further be used to recommend careers for the subject.

Non-limiting examples of tasks that can be part of the system include Analogical Reasoning, Balloon Analogue Risk Task, Choice Task, Dictator Task, Digit Span, EEfRT, Facial Affect Task, Finger Tapping, Future Discounting, Flanker Task, Go/No-Go, Mind in the Eyes, N-Back, Pattern Recognition, Reward Learning Task, Tower of London, and the Trust Task.

The system can implement a wide range of machine learning techniques to build models that provide the most accurate prediction. A model generated by the system can learn to capture characteristics of interest from the training data without knowing the underlying probability distribution. Training data can be seen as examples that illustrate specific relationships between the observed variables. An advantage of machine learning is automatic recognition of complex patterns and intelligent decisions based on example data. The system can use, for example, non-linear, non-parametric classification techniques, which can perform better than traditional pattern classification algorithms in data sets having many attributes with a small training dataset.

Applications of a System of the Invention.

A system of the invention can be used by a business entity to find subjects to work on behalf of the entity. Non-limiting examples of a business entity include a corporation, a cooperative, a partnership, a company, a public limited company, a private company, a public company, a limited liability company, a limited liability partnership, a charter corporation, an organization, a non-profit organization, a staffing agency, an academic institution, a government facility, a government agency, a military department, and a charitable organization. Users of a system of the invention can further include, for example, recruiters, human resources personnel, managers, supervisors, hiring officers, and employment agencies.

Non-limiting examples of subjects who can work on behalf of a business entity include an employee, a full-time employee, a part-time employee, a statutory employee, a temporary employee, a contractor, an independent contractor, a subcontractor, an emeritus employee, a consultant, and an advisor.

A system of the invention can also be used by a subject to determine the subject's career propensities. Subjects who can use the invention include, for example, students, postgraduates, job seekers, and individuals seeking assistance regarding career planning. A subject can complete the tasks of the system, after which the system can create a profile for the subject based upon identified traits of the subject. A user can access a system of the invention from a computer system. The user can then complete the computerized tasks of the system using, for example, a computer, a laptop, a mobile device, or a tablet.

A subject's profile can be compared to a database of test subjects to score the subject and generate a model for the subject based on reference models. The test subjects can, for example, work for a business entity. The system can additionally generate a fit score for the subject based on the test subjects who work for a business entity and the test subjects' specific positions at the business entity. A system of the invention can recommend various industries to a subject based upon the subject's determined career propensity. Non-limiting examples of the industries that can be recommended by the system include consulting, education, healthcare, marketing, retail, entertainment, consumer products, entrepreneurship, technology, hedge funds, investment management, investment banking, private equity, product development, and product management.

A system of the invention can use a series of emotional and cognitive traits to determine a subject's talents and propensity for different career fields. The emotional traits that can be measured by a system of the invention include, for example, trust, altruism, perseverance, risk profile, learning from feedback, learning from mistakes, creativity, tolerance for ambiguity, ability to delay gratification, reward sensitivity, emotional sensitivity, and emotional identification. The cognitive traits that can be measured by a system of the invention include, for example, processing speed, pattern recognition, continuous attention, ability to avoid distraction, impulsivity, cognitive control, working memory, planning, memory span, sequencing, cognitive flexibility, and learning.

Emotional traits can be important factors in determining whether a subject will be suitable for the company, and a specific role within the company. A system of the invention can assess a variety of emotional traits to assist a user of the system in making decisions.

Trust can be evaluated as a willingness to rely upon another's actions without knowledge of the other's actions. Trust can demonstrate whether the subject can work effectively in a group setting, and rely on others' opinions and actions.

Altruism can be assessed as selflessness, or the willingness to perform actions for the welfare of others. Altruism can demonstrate that the subject can be more willing to serve the needs of the company than the needs of the self.

Perseverance can be described as continuing on a course of action without regard to discouragement. Perseverance can demonstrate that even in times of failure or opposition, the subject can find a solution and focus on assigned tasks.

Creativity can demonstrate that the subject can have unconventional approaches for solving problems and performing tasks.

A risk profile for a candidate can identify the willingness of a subject to take risks. A subject who is more willing to take risks can be more favorable for a company that deals with high-risk, high-pressure situations.

Learning from feedback can measure whether a subject can use suggestions from others to modify behaviors or actions while performing a function of a job. Learning from mistakes can assess whether a subject can use mistakes made on a task to modify future behavior to perform the same task.

A tolerance for ambiguity can assess a subject's comfort level with uncertain or incomplete situations, and stimuli, and the subject's reactions to the same. A subject with a tolerance for ambiguity can be more creative and resourceful when faced with incomplete or questionable data.

A subject with an inclination toward delayed gratification can appeal to a company because the subject can work harder, and for a longer period time, in expectation of a raise or bonus.

Reward sensitivity is related to delayed gratification in that reward sensitivity can measure how motivated a subject is by the promise of a reward. A company can desire a subject who is not only intrinsically motivated, but also sensitive to rewards, such as raises and bonuses.

Emotional sensitivity and identification can describe whether a subject is able to respond to another's emotions in an appropriate manner, and whether the subject is able to identify correctly the emotions of another. Subjects with higher emotional sensitivity and identification abilities can be better team players and leaders.

In addition to the emotional traits that can be measured by a system of the invention, cognitive traits can also be assessed and used by a business entity to determine whether a subject is suitable for employment.

Processing speed relates to the ability to process information thoroughly and speedily, without the need for intentional thought. A subject with a higher processing speed can be desirable to a company in that the subject can think and react to situations quickly.

Pattern recognition can refer to the ability to recognize a set of stimuli arranged in a certain manner that is characteristic of that set of stimuli. A subject with higher pattern recognition skills can demonstrate better critical thinking skills and identify trends in data.

A subject with a higher continuous attention score can demonstrate a higher ability to sustain attention on a single task. A subject can also be assessed for the ability to avoid distraction, and focus on specific tasks.

Impulsivity can be evaluated as performing actions without foresight, reflection, or consideration of consequences. A subject who is impulsive can be viewed unfavorably by a potential employer, as the subject can make rash decisions that can prove disadvantageous for the company. An impulsive subject can also be viewed favorably if the company desires a subject more willing to take risks, think creatively, and act quickly.

Cognitive control can describe a variety of cognitive processes including working memory, learning, cognitive flexibility, and planning. Working memory is the active part of the memory system and can involve both short-term memory and attention. A subject with high working memory can display more focused attention to a task and the ability to multi-task.

Cognitive flexibility can be described as the ability to switch from different tasks and to think about multiple tasks simultaneously and effectively. A subject with cognitive flexibility can balance many tasks efficiently.

Planning demonstrates an ability to organize actions to achieve a goal, and can demonstrate foresight in the execution of tasks.

Memory span is a measure of short-term memory and can be assessed by having a subject recite a series of numbers or words presented previously. A subject with a greater memory span can remember instructions and perform a specific task better than someone with a short memory span.

Sequence learning is the ability to sequence actions and thoughts, without conscious awareness that such sequencing is occurring. Sequence learning can comprise four sequencing problems. First, sequence prediction can attempt to predict elements of a sequence based on the preceding elements. Second, sequence generation can attempt to piece together elements of the sequence one-by-one as the elements naturally occur. Third, sequence recognition can attempt to ascertain whether the sequence is legitimate based on a pre-determined criteria. Finally, sequence decision-making can involve selecting a sequence of actions to achieve a goal, to follow a trajectory, or to maximize or minimize a cost function.

A system of the invention can be used to match an individual or group of individuals to another individual or group of individuals for the purposes of recommending compatibility within the professional or personal realm.

Statistical Functions Used in a System of the Invention.

The tests used in a system of the invention can be assessed for their precision of measurements. The precision of the tests can be important for determining if the tests are accurate predictors of human emotion and cognition. To ascertain the precision of the tests, reliability assessments can be performed. One output that can be measured for test reliability is the Pearson's correlation coefficient (r). The Pearson's correlation coefficient can describe the linear relationship between two results and is between −1 and +1. The correlation coefficient for a sample, r, can be calculated using the following formula:

$$r = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}},$$

where n is the sample size; i=1, 2, . . . , n; X and Y are the variables, and $\overline{X}$ and $\overline{Y}$ are the means for the variables. The square of the Pearson's correlation coefficient, $r^2$, is known as the coefficient of determination and can be used to explain the fraction of variance in Y as a function of X in a simple linear regression.

The Pearson's correlation coefficient can also be used to describe effect size, which can be defined as the magnitude of the relationship between two groups. When the Pearson's correlation coefficient is used as a measure for effect size, the square of the result can estimate the amount of the variance within an experiment that is explained by the experimental model.

Reliability can be an indicator of the extent to which measurements are consistent over time and free from random error. Reliability can measure whether the test results are stable and internally consistent. The test-retest method is one measure that can be used for reliability. Test-retest reliability test can measure a change in a sample's results when the sample is administered the same test at two different times. If the results from the test given at two different times are similar, then the test can be considered reliable. The relationship between the two results can be described using the Pearson's correlation coefficient; the higher the value of the correlation coefficient, the higher the reliability of the test.

The value of the correlation coefficient for test-retest reliability can be, for example, about −1.0, about −0.95, about −0.9, about −0.85, about −0.8, about −0.75, about −0.7, about −0.65, about −0.6, about −0.55, about −0.5, about −0.45, about −0.4, about −0.35, about −0.3, about −0.25, about −0.2, about −0.15, about −0.1, about −0.05, about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, or about 1.0.

Another test that can be used for measuring reliability of a test is the split-half reliability test. The split-half reliability test divides a test into two portions, provided that the two portions contain similar subject matter, and the test is administered to a sample. Then, scores of each half of the test from the sample are compared to each other. The correlation, or degree of similarity, between the scores from the two halves of the test can be described using the Pearson's correlation coefficient, wherein if the correlation is high, the test is reliable.

The value of the correlation coefficient for split-half reliability can be, for example, about −1.0, about −0.95, about −0.9, about −0.85, about −0.8, about −0.75, about −0.7, about −0.65, about −0.6, about −0.55, about −0.5, about −0.45, about −0.4, about −0.35, about −0.3, about −0.25, about −0.2, about −0.15, about −0.1, about −0.05, about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, or about 1.0.

Validity is the extent to which a test measures what is intended. For a test to be valid, a test can demonstrate that the results of the test are contextually supported. Specifically, evidence regarding test validity can be presented via test content, response processes, internal structure, relation to other variables, and the consequences of testing.

A Hotelling's T-squared test is a multivariate test that can be employed by a system of the invention to determine the differences in the means of the results of different populations of subjects using the system. The test statistic ($T^2$) for the T-squared test is calculated using the formula below:

$$T^2 = (\bar{x}_1 - \bar{x}_2)' \left\{ S_p \left( \frac{1}{n_1} + \frac{1}{n_2} \right) \right\}^{-1} (\bar{x}_1 - \bar{x}_2),$$

where $\bar{x}$ is the sample mean, $S_p$ is the pooled variance-covariance of the samples, and n is the sample size.

To compute the F-statistic, the following formula is used:

$$F = \frac{n_1 + n_2 - p - 1}{p(n_1 + n_2 - 2)} T^2 \sim F_{p, n_1 + n_2 - p - 1},$$

where p is the number of variables being analyzed, and the F-statistic is F-distributed with p and $n_1+n_2-p$ degrees of freedom. An F-table can be used to determine the significance of the result at a specified $\alpha$, or significance, level. If the observed F-statistic is larger than the F-statistic found in the table at the correct degrees of freedom, then the test is significant at the defined $\alpha$ level. The result can be significant at a p-value of less than 0.05 if, for example, the $\alpha$ level was defined as 0.05.

Analysis of variance (ANOVA) is a statistical test that can be used by a system of the invention to determine a statistically significant difference between the means of two or more groups of data. The F-statistic for ANOVA can be calculated as follows:

$$F = \frac{\frac{n_1(\bar{x}_1 - \bar{x})^2 + n_2(\bar{x}_2 - \bar{x})^2 + \ldots + n_I(\bar{x}_I - \bar{x})^2}{I - 1}}{\frac{(n_1 - 1)s_1^2 + (n_2 - 1)s_2^2 + \ldots + (n_I - 1)s_I^2}{N - I}},$$

where $\bar{x}$ is the sample mean, n is the sample size, s is the standard deviation of the sample, I is the total number of groups, and N is the total sample size. An F-table is then used to determine the significance of the result at a specified $\alpha$ level. If the observed F-statistic is larger than the F-statistic found in the table at the specified degrees of freedom, then the test is significant at the defined $\alpha$ level. The result can be significant at a p-value of less than 0.05 if, for example, the $\alpha$ level was defined as 0.05.

The $\alpha$ level for the Hotelling's T-squared test or ANOVA can be set at, for example, about 0.5, about 0.45, about 0.4, about 0.35, about 0.3, about 0.25, about 0.2, about 0.15, about 0.1, about 0.05, about 0.04, about 0.03, about 0.02, about 0.01, about 0.009, about 0.008, about 0.007, about 0.006, about 0.005, about 0.004, about 0.003, about 0.002, or about 0.001.

Any tool, interface, engine, application, program, service, command, or other executable item can be provided as a module encoded on a computer-readable medium in computer executable code. In some embodiments, the invention provides a computer-readable medium encoded therein computer-executable code that encodes a method for performing any action described herein, wherein the method comprises providing a system comprising any number of modules described herein, each module performing any function described herein to provide a result, such as an output, to a user.

EXAMPLES

Example 1: Analogical Reasoning

The Analogical Reasoning Task can measure the ability of a subject to discern connections between concepts or events that are seemingly unrelated. Analogical reasoning can further refer to tasks using analogies to model novel connections between situations or representations that do not seem similar on the surface. Analogical reasoning has frequently been linked to creative problem-solving as both require individuals to generate innovative ideas within the constraints of a particular task. The more disparate two situations appear, the more creative the analogical reasoning process can be. The likeness between two situations, concepts, events, or representations can be described by semantic distance. The greater the semantic distance, the less similarity exists between the two presented situations. In the analogical reasoning task, the semantic distance can be highly correlated with independent raters' evaluations of creativity, as in the subject can be perceived as more creative when the subject forms a connection between situations that seem highly dissimilar. Functional magnetic resonance imaging (fMRI) can be used to measure brain activity during an analogical reasoning task, and the semantic distance between the items in the analogies can be parametrically varied. Critically, semantic distance of analogical mapping, and not task difficulty, as assayed by response time, correctness, and rated difficulty, can modulate brain activity.

In the present invention, a subject was presented with two sets of word pairs and then asked to determine whether the second set was analogous to the relationship between the first set. A system of the present invention performed a test-retest study using an undergraduate sample (N=38) with a two-week interval between testing sessions. The test-retest reliability of the analogical reasoning task was found acceptable at about r=0.63.

Example 2: Balloon Analogue Risk Task (BART)

In the BART, subjects earned money in a computer game wherein with each click on a cartoon pump, a simulated balloon inflated and a small amount of money was deposited into a temporary bank account. The subjects were allowed to collect the money at any point. However, if the balloon popped, the temporary bank account accrued no money and the trial ended. The number of clicks by the subject served as a measure of risk-taking, and the task lasted for about 80 trials.

Performance on a BART can be correlated with several other risk-related constructs including the Barratt Impulsivity Scale, the Sensation Seeking Scale, and the Behavioral Constraint scale.

The validity of the BART can be determined by looking at how performance on the BART correlates to self-report measures completed by the test subjects. To demonstrate the incremental validity of the BART in predicting risky behavior, a step-wise regression analysis can be done using age, gender, impulsivity, and sensation seeking in step one, and factoring in the BART results in step two. Regression analysis of steps one and two can show that even while controlling for other factors, higher BART scores can be linked to a higher propensity for risky behavior. The BART can be significantly correlated to impulsivity, sensation seeking, and a risk score, while not having a significant correlation with other demographic factors.

A test-retest study was done by a system of the invention using an undergraduate sample (N=40) with a two-week interval in between testing sessions. The test-retest reliability was found to range from an r of about 0.65 to about 0.88 depending on the level of risk. Another study conducted on a community sample (N=24) showed that split-half reliability ranged from an r of about 0.88 to about 0.96, depending on the level of risk.

Example 3: Choice Task

The Choice Task can be used as a measure of risk-taking inclinations of a subject. The Choice Task can include a set of scenarios, in which subjects are asked to evaluate based on a series of choice sets. The choice sets can comprise alternatives that are mutually exclusive and independent, and generally one alternative can be considered the riskier of the two options. A study can be conducted wherein subjects are asked to complete a variety of tests that measure personality and behavioral risk measures. Tests that the subjects can complete include Zuckerman's Sensation Seeking Scale, Eysenck's Impulsivity Scale, Retrospective Behavioral Self-Control Scale, Domain Specific Risk Taking Scale, Choice Task, Balloon Analogue Risk Task, Variance Preference Task, Future Discounting I, and Future Discounting II. A principal components analysis can be done to determine which principal components are the underlying measures of risk. For instance, variance preference can be correlated with the Choice Task. Variance preference can be a strong measure for risk, and can be described as a personality tendency for excitement and extroversion.

In a system of the invention, subjects were asked if they would either receive a set amount of money or bet on a chance of receiving a higher amount of money. The amounts of money and the chances of receiving the money were varied to make the options seem more or less risky. Two studies were undertaken by the system to establish the test-retest reliability of the Choice Task. One study was conducted with an undergraduate sample (N=40) with a two-week interval between testing sessions. The measured test-retest reliability was found to be about r=0.62. The second study was a split-half reliability study using a community sample (N=24). The split-half reliability was found to be about r=0.82.

Example 4: Dictator Task

The Dictator Task can be used in behavioral economics as a measure of generosity and altruism. To determine the validity of this game, the subjects can be asked to report on their philanthropy over the past year. For example, subjects that donated their fictional earnings during the task can be found to have, in reality, donated more to philanthropic causes in the past year than those who did not donate their fictional earnings during the task.

In the present invention, subjects were paired with random participants where both the subject and the random participant initially received the same amount of money. Subsequently, the subject was given an additional amount of money and instructed to give the random participant none, some, or all of the money. The amount of money donated to the random participant was used as a measure of altruism. A test-retest study was conducted by a system of the invention using an undergraduate sample (N=40) with a two-week interval in between testing sessions. The test-retest reliability was found acceptable at about r=0.62. The split-half reliability was also measured using a community sample (N=24) and the reliability was found acceptable at about r=0.65.

Example 5: Digit Span

The Digit Span task can be used to measure a subject's working memory number storage capacity. In a system of the invention, subjects were presented with a series of digits and, when prompted, asked to repeat the sequence of digits by entering the digits on a keyboard. If the subject successfully recited the numbers, then the subject was given a longer sequence to remember and recite. The length of the longest list a subject can remember is the subject's digit span.

Digit Span can be positively correlated with all measures of working memory, including measures used to represent capacity and processing, and Digit Span can be negatively correlated with age. The Digit Span task can have adequate reliability for healthy adults over a one-month interval.

Digit Span tests were conducted. In a community sample (N=23), the split-half reliability for the Digit Span task was found acceptable at r=0.63. A test-retest study with a two-week interval between testing sessions on an undergraduate sample (N=39) also showed acceptable reliability where r=0.68.

Example 6: EEfRT (Easy or Hard)

The Effort-Expenditure for Rewards Task (EEfRT) can be used to explore effort-based decision-making in humans. The EEfRT can measure how much effort a person is willing to expend for a reward. Across multiple analyses, a significant inverse relationship can be observed between anhedonia and willingness to expend effort for rewards. Increased trait anhedonia can significantly predict an overall reduced likelihood of expending effort for a reward, indicating that the EEfRT task can be an effective proxy for motivation and effort-based decision-making.

In a system of the invention, subjects were presented with a choice to complete an easy or a hard task. The easy task involved pressing the space bar of a keyboard fewer times than did the hard task. Completion of the easy task guaranteed the same reward every time, whereas completion of the hard task provided a chance of receiving a much higher reward. Subjects who were more inclined to pick the harder task were assessed as being more motivated by reward, even when more effort was required.

The system conducted tests on reliability for the EEfRT. In a community sample (N=24), the split-half reliability for the EEfRT was found to be above average at r=0.76. A second study was conducted using an undergraduate sample (N=40) with a two-week interval between testing sessions. The test-retest reliability was found acceptable at r=0.68.

Example 7: Facial Affect Test

Situational factors can have a strong influence on a subject's interpretation of emotional expression if a facial expression provides relevant, but unclear information. Within this limited context, most subjects can judge the expresser to feel an emotion that matches the situation, rather than their actual facial expression. Situational information can be especially influential when suggesting a non-basic emotion, for example, a person can be in a painful situation, but display an expression of fear. Often, a subject judging the expression of the person concludes that the person's expression is that of pain, not of fear.

In a system of the invention, subjects were presented with photographs of men and women displaying different emotions. In some instances, the photographs were presented with a story describing the situation, while other photographs were presented alone. The subjects were instructed to choose from a set of four emotions that best described the expression of the person in the photograph. Subject who could correctly identify the emotion without being presented with story were described as having an acute ability to read facial expressions.

The system conducted reliability tests on the Facial Affect Task. The split-half reliability of the Facial Affect task was measured using a community sample (N=24). The split-half reliabilities were found above average, with r values ranging from about 0.73-0.79. An undergraduate sample (N=40) was measured twice, with a two-week interval between sessions. The test-retest reliability was found acceptable, with r values of about 0.57-0.61.

Example 8: Finger Tapping (Keypresses)

The Finger-Tapping test (FTT) is a psychological test that can assess the integrity of the neuromuscular system and examine motor control. The task can have good reliability over a one-month interval.

A simple motor tapping task can be conducted on healthy subjects. The subjects can be required to tap a stationary circle on a touch-screen monitor with the index finger of their dominant hand as fast as possible for 60 seconds. The test-retest interval can be about four weeks, and can have a significantly high reliability correlation.

In a system of the invention, subjects were asked to hit the space bar of a keyboard repeatedly using the dominant hand for a specified amount of time. The split-half reliability of the FTT was assessed using a community sample (N=24). Key measures were found reliable with r values of about 0.68-0.96. A test-retest study used an undergraduate sample (N=40) with an interval of two weeks between testing sessions. Reliabilities for relevant measures were found acceptable, with r values between about 0.58-0.77.

Example 9: Future Discounting

Temporal future discounting can refer to the extent to which individuals prefer immediate, but modest, rewards to future, but sizeable, rewards. Temporal discounting can be modeled as an exponential function leading to a monotonic decrease in preference with increased time delay, wherein individuals discount the value of a future reward by a factor that increases with the delay of the reward. Hyperbolic discounting can refer to a time-inconsistent model of future discounting. When a hyperbolic model is used to model future discounting, the model can suggest that valuations fall very rapidly for small delay periods, but then fall slowly for longer delay periods. A hyperbolic curve can show a better fit than other models, providing evidence that individuals discount delayed rewards.

In a system of the invention, subjects were presented with questions, wherein the subjects had to choose between receiving a certain amount of money now, or more money at a specified time in the future. The amount of money and time when the money would be given to the subject was varied to increase or decrease the delay and size of the reward.

The system conducted reliability tests of the Future Discounting Task. The split-half reliability of the future discounting task was assessed using a community sample (N=24). The split-half reliability for log-transformed data was found acceptable at about r=0.65. A test-rest study assessed the reliability of the future discounting task using a sample of undergraduates (N=40), with a two-week interval between testing sessions. The reliability of the log-transformed data was found acceptable at about r=0.72.

Example 10: Flanker Task

The Flanker Task can be used to examine task switching capabilities in a subject. The Flanker Task can refer to a set of response inhibition tests used to assess the ability to suppress responses that are inappropriate in a particular context. The Flanker Task can be used to assess selective attention and information processing capabilities. A target can be flanked by non-target stimuli, which correspond either to the same directional response (congruent stimuli) as the target, to the opposite response (incongruent stimuli), or to neither (neutral stimuli). Different rules are given to the subject as to how the subject should react to what they see.

Consistently poor performance can be observed when subjects are asked to switch tasks versus repeat a task, showing validity for the task-switching effects of the flanker task. The anterior cingulate cortex (ACC), which can be more active in response to incongruent stimuli compared to congruent stimuli, can be activated during the Flanker Task and can monitor the amount of conflict in the task. The level of conflict measured by the ACC can provide more control to the subject on the next trial, indicating that the more conflict presented in trial n, the more control can be presented by the subject in trial n+1.

The Flanker Task and transcranial magnetic function (TMS) can be used to find the time course of a post-error adjustment leading to a post-error slowing (PES). Some results can show that the excitability of the active motor cortex can decrease after an erroneous response.

In a system of the invention, subjects were instructed to press specific arrow keys on a keyboard depending upon the direction and color of five presented arrows. If a red arrow was the central arrow among five red arrows, then the direction of the central red arrow dictated which key to press. If a red arrow was the central arrow among four blue arrows that all pointed in the same direction, then the direction of the blue arrows dictated which key the subject should press. For example, if the subject was shown a sequence of five red arrows pointing to the right, then the subject should have pressed the right arrow key. If the next image showed the red, central arrow pointing to the right, but the rest of the red arrows pointed to the left, then the subject should have pressed the right arrow key again. However, if the next image showed the red, central arrow pointing to the right surrounded by blue arrows pointing to the left, then the subject should have pressed the left arrow key. The ability to push the correct arrow key based upon the "flankers," or arrows surrounding the central arrow, was used to measure the task switching abilities in the subject.

The system conducted reliability tests for the Flanker Task. The split-half reliability of the Flanker Task was assessed using a community sample (N=14). Key measures were found reliable with r values of about 0.70-0.76. In a second study, an undergraduate sample (N=34) was used to assess test-retest reliability. Results for relevant measures were found acceptable, with r values of about 0.51-0.69.

Example 11: Go/No-Go

A Go/No-Go test can be used to assess a subject's attention span and response control. An example of a Go/No-Go test can include having a subject press a button when a specific stimulus is present ("Go"), and not pressing the same button when a different stimulus is presented ("No-Go"). Performance on the Go/No-Go task, especially for inhibition trials, can be related to complex executive functions measured by the Wisconsin Card Sorting Task, Stroop Color-Word Test, and Trail Making Test.

In a system of the invention, subjects were presented with either a red circle or a green circle and instructed to press the space bar when shown the red circle, but press nothing when shown the green circle. The split-half reliability of the Go/No-Go task was studied using a community sample (N=23). The split-half reliabilities for relevant measures were found acceptable, with r values of about 0.56. A test-retest study was also conducted on a sample of undergraduates (N=33) with a two-week interval between sessions. The reliability on a key measure was found strong of about r=0.82.

Example 12: Mind in the Eyes

The Mind in the Eyes test can evaluate social cognition in subjects by assessing the subject's ability to recognize the mental state of others using just the expressions around the eyes. A series of experiments varying the type of emotion, amount of face used as stimuli, and gender of stimuli can be conducted to determine how subjects perceive basic and complex emotions. Healthy controls can perceive both basic and complex emotions well from the whole face, but for complex mental states, the subjects' scores can be higher looking at just the eyes. This finding suggests that the eyes can hold more information than the whole face.

In a system of the invention, subjects were presented with a series of photographs revealing only the eyes of the individuals in the photographs. The subjects were then instructed to choose the emotion that they felt was best represented by the eyes. The choices of emotion ranged from basic, for example, sad, happy, angry, and surprised, to complex, for example, arrogant, regretful, judgmental, and nervous. Subjects who were able to read emotions correctly from the eyes were described as more emotionally perceptive.

The system conducted reliability tests on the Mind in the Eyes task. The split-half reliability of the Mind in the Eyes task was assessed in a community sample (N=23), and the split-half reliability had an above average correlation of about r=0.74. A test-retest study on an undergraduate sample (N=38) with a two-week interval between testing sessions had acceptable reliability of about r=0.67.

Example 13: N-Back (Letters)

The N-back task is a continuous performance task that can be used to measure working memory in a subject. For example, a subject can be presented with a sequence of stimuli, and the subject must indicate when the current stimulus matched the stimulus from n steps earlier in the sequence. The value of n can be adjusted to make the task more or less difficult. An N-back task at two levels of complexity can be compared to performance on the Digit Span Test on the Wechsler Adult Intelligence Scale Revised (WAIS-R). Accuracy scores for the N-back task can be positively correlated with performance on the Digit Span subtest of the WAIS-R. The Digit Span subscale of the WAIS-R can reflect certain cognitive processes, which can overlap with working memory capacity, indicating that accuracy scores on the N-back task can be associated with individual differences in working memory capacity.

In a system of the invention, subjects were presented with letters and instructed to press the space bar when the same letter was shown two frames earlier. Subjects who were able to identify the second instance of the letter correctly were assessed as having a high working memory.

The system conducted reliability tests for the N-Back task. The split-half reliability of the N-back test was assessed in a community sample (N=24), and was found to have above average reliability at about r=0.83. A test-retest study used an undergraduate sample (N=38) with a two-week interval between testing sessions. The reliability was found acceptable of about r=0.73.

Example 14: Pattern Recognition

The Pattern Recognition task can measure the ability of a subject to discern patterns and similarities from a sequence of stimuli or objects.

The Raven's Progressive Matrices (RPM) test is similar to the Pattern Recognition Task. The Advanced Progressive Matrices (APM) test, which is one form of the Raven's Progressive Matrices test, can have very good test-retest reliability. The reliability coefficient can range from about 0.76 to about 0.91.

In a system of the invention, the subjects were presented with a grid of colored squares with one corner missing. The subjects had to choose an image from six images that would correctly complete the pattern in the grid, and the subjects who were able to identify the image correctly were assessed as having high pattern recognition abilities.

The system conducted reliability tests for the Pattern Recognition Task. To assess test-retest reliability, the task was administered to a sample of undergraduates (N=36) with a two-week interval between sessions. The reliability was found acceptable at about r=0.55.

Example 15: Reward Learning Task

To assess the relationship between a subject's ability to adjust behavior as a function of reward, a reward-learning task can be developed wherein subjects earn an amount of money determined by a differential reinforcement schedule. A subject can be presented with a choice, wherein one choice can be associated with a reward, but receipt of the reward is dependent on picking the correct choice. As a subject learns which choice is correct, the reward can increase.

In a system of the inventions, subjects were presented with digital faces that either had a short mouth or a long mouth. The difference in lengths of the mouth was minimal, but perceptible by the human eye. The subjects were asked to press the right arrow key when presented with the face with the long mouth, and the left arrow key when presented with the face with the short mouth. The subjects were additionally told that they could receive money if they picked the correct choice. The Reward Learning Task was used to determine whether the subjects were able to learn which stimulus was correct based upon the receipt of a reward.

The system conducted reliability tests on the Reward Learning Task. The split-half reliability of the reward task was assessed in a community sample (N=24), and was found to have an above average reliability on a key measure where r=0.78. An undergraduate sample (N=40) was used in a test-retest study with a two-week interval between sessions. The test-retest reliability of a key measure was found above average at about r=0.66.

Example 16: Tower of London (TOL)

The TOL task can be used to assess executive function and planning capabilities. The mean number of moves and mean initial thinking time (ITT) can be computed for different difficulty levels of the task. The ITT can correspond to elapsed time between the presentation of the puzzle and the moment when a subject begins solving the puzzle.

Negative correlations can exist between total mean ITT score and total mean move score, suggesting that a longer ITT score helps to reduce the number of moves, in other words, ITT can reflect planning. Variables measuring the number of moves, accurate performance, and time before making the first move on Tower of London tasks can have effect sizes of between 0.61 and 1.43.

A series of TOL tasks for use in research and clinical settings can be assessed to show a clear and nearly-perfect linear increase of task difficulty across minimum moves. In other words, low-, medium-, and high-performing subjects can attain correct solutions in problems up to a level of low-, medium-, and high-minimum moves, respectively, but not above. Accuracy on the task can differ by the number of minimum moves.

In a system of the invention, subjects were presented with two sets of three pegs. The target set of pegs had five colored discs around one peg, while the experimental set of pegs had the five colored discs distributed across the three pegs. The object of the task was to match the arrangement of the colored discs in the experimental set with that of the target set. Subjects who could complete the task within the specified time period with the minimum number of moves were assessed as having high planning abilities.

The system conducted reliability tests on the TOL task. The split-half reliability of the TOL task was assessed in a community sample (N=24), and the TOL task was found to have a good reliability for time, a key measure, of about r=0.77. A test-retest study using a sample of undergraduates (N=39) was conducted with a two-week interval between test sessions. The reliability for time using this method was found above average at about r=0.69.

Example 17: Trust Task

The Trust Task can be used to study trust and reciprocity while controlling for reputation, contractual obligations, or punishment. The Trust Task can have two stages. First, subjects can be given money and then the subjects can decide how much, if any, of the money they will send to an unknown person in a different location. Subjects can be told that the amount of money they send will double by the time it reaches the other person. Then, the other person has the option to send money back to the subject.

Performance on the Trust Task can be associated with personality measures including Machiavellianism, and relational motives, for example, high concern for others and low concern for self. Participation in trust tasks can influence neurophysiological responses, for example, the production of oxytocin, and can be associated with the location, magnitude, and timing of neural responses in areas of the brain related to trust and social relationships.

In a system of the invention, subjects were paired with a random participant. The subject received money while the random participant received no money. The subjects were instructed to send some, or all, of their money to the random participant while knowing that the money would triple by the time the money reached the other person. The other person was then able to send none, some, or all of the money back to the subject. The subjects can then assess the fairness of the random participant based on the amount of money they sent back. Subjects who sent more money were perceived as more trusting than those subjects who sent less money to the random participant.

The system conducted reliability tests for the Trust Task. A split-half reliability study was done with a community sample (N=24) for the Trust Task. The split-half reliability was found reasonable at about r=0.60. The test-retest reliability was measured in a sample of undergraduates (N=40). A key measure was found acceptable at about r=0.59.

TABLE 1 displays a summary of reliability measures calculated in the preceding examples for the illustrative tasks that can be used by a system of the invention.

TABLE 1

| Task | Test-Retest Reliability (N) | Split-Half Reliability (N) |
|---|---|---|
| Analogical Reasoning (Words) | .63 (38) | Not Tested |
| Balloon Analogue Risk Task (Balloons) | .65-.88 (40) | .88-.96 (24) |
| Choice Task (Choices) | .62 (40) | .82 (24) |
| Dictator Task (Money Exchange 2) | .62 (40) | .65 (24) |
| Digit Span (Digits) | .68 (39) | .63 (23) |
| EEfRT (Easy or Hard) | .68 (40) | .76 (24) |
| Facial Affect Test (Faces) | .57 (40) | .73-.79 (24)) |
| Finger Tapping (Keypresses) | .58-.77 (40) | .68-.96 (24) |
| Flanker Task (Arrows) | .68-.69 (34) | .71-.76 (14) |
| Future Discounting (Now or Future) | .72 (40) | .51 (24) |
| Go/No-Go (Stop1) | .82 (38) | .56 (23) |
| Mind in the Eyes (Eyes) | .67 (38) | .74 (23) |
| N-Back (Letters) | .73 (38) | .83 (24) |
| Reward Learning Task (Lengths) | .66 (40) | .78 (24) |
| Tower of London (Towers) | .69 (39) | .77 (24) |
| Trust Task (Money Exchange 1) | .59 (40) | .60 (24) |

Example 18: Use of a System of Invention to Classify Employees

Company A was a consulting firm with 22 employees. The company identified four of their employees in this group as top performers, while the other 18 were not identified as top performers. The system was able to classify employees as bottom or top performers using behavioral data from the employees' performance on neuroscience tests described herein using integrated algorithms. The system's algorithms transformed each employee's set of behavioral data into a fit score that ranged from 0-100. The fit scores indicated a likelihood of an employee belonging to one group or another. An individual with a 50% fit score can be equally likely to be classified as a bottom performer or a top performer, whereas an employee with a 90% fit score can be much more likely to be a true top performer, and an employee with a 10% fit score can be much more likely to be a bottom performer. The system performed binary classification while maximizing model accuracy, and the decision boundary was adjusted to ensure the minimization of false positives and false negatives.

The system built a model that correctly identified the four top performers. The model also classified two bottom performers as top performers, which means that 16 employees were correctly identified as bottom performers. The system used a decision boundary of 60% to minimize both false positives and false negatives. TABLE 2 displays the results of this analysis, and indicates how the system's classification matched the company's classification. For example, the system classified two employees as top performers, when, in fact, the company classified those employees as bottom performers. Thus, using a sample of 22 individuals, the system built a model that classified the employees with 91% accuracy.

TABLE 2

|  |  | Company Classification | |
|---|---|---|---|
|  |  | Top Performer | Bottom Performer |
| System Classification | Top Performer | 4 | 2 |
|  | Bottom Performer | 0 | 16 |

Example 19: Use of a System of the Invention to Determine Potential Job Performance During a recruiting effort, Company A had 235 individuals apply. The applicant pool consisted of undergraduate students matriculating from a large university. All applicants were assessed both by Company A's standard resume review process and by the system's battery of tests. The system was used to increase the efficiency of resume review and to reduce the likelihood of missed talent.

Utilizing the predictive model built in EXAMPLE 18, the system attempted to identify applicants who were most likely to receive job offers. To understand whether the system's algorithms can increase the yield of extended offers, the system first compared the number of candidates to whom Company A extended offers versus how many candidates were invited to interview based on Company A's standard resume review process. Subsequently, the system computed a similar ratio of extended offers to interviews, based on the system's algorithms in conjunction with Company A's standard resume review process (TABLE 3). By utilizing the algorithms herein in combination with Company A's standard resume review process, the system increased the yield of extended offers from 5.3% to 22.5%

TABLE 3

| Total # of applicants | Interview decided by | Selected to interview | Offers | Yield |
|---|---|---|---|---|
| 235 | Company A Resume Review Only | 76 | 4 | 5.3% |
|  | The system + Company A Resume Review | 18 | 4 | 22.5% |

Company A also used the system to help reduce missed talent among applicants. The company asked the system to recommend 10 applicants from the 141 applicants that were rejected by Company A's standard resume review process. The system was able to match, and slightly exceed, the yield of the company's standard resume review process when evaluating candidates that the company rejected by identifying one candidate that was offer-worthy among 10 candidates that the system recommended (TABLE 4).

TABLE 4

| Total # of applicants | Company resume review outcome | Selected to interview | Offers | Yield |
|---|---|---|---|---|
| 235 | Interview 94 | Company A 94 | 8 | 8.5% |
|  | No Interview 141 | Systems of the Invention 10 | 1 | 10% |

Company A also used the system as a service for replacing resume review. The system's algorithms identified 28 of the 235 applicants as being worthy of an interview. The company interviewed those 28 individuals and extended offers to five of them (TABLE 5). Thus, the system was able to increase the yield of applicants who were extended offers from 8.5% to 17.9%.

TABLE 5

| Total # of applicants | Interview decided by | Selected to interview | Offers | Yield |
|---|---|---|---|---|
| 235 | Company A Resume Review Only | 94 | 84 | 8.5% |
|  | Systems of the invention | 28 | 5 | 17.9% |

The system can be utilized for three distinct purposes. The system can increase the efficiency of resume review by increasing the yield of applicants to whom offers are extended. The system can reduce missed talent by assessing candidates that the company's resume review process did not otherwise consider. Lastly, the system can be used to replace resume review in situations when the company does not have the budget to support a recruiting team.

Example 20: Use of a System of the Invention to Provide Career Feedback

Company B asked the system to build models to classify employees across a range of sales positions as top performers using data from their performance on the battery of neuroscience-based tests from a group of 782 employees measured over one month. The goal of the analysis was to provide career development feedback and re-staffing advice, if necessary.

The system built models using algorithms to classify employees within each of the employee positions as either a top performer or a bottom employee. These models allowed the system to report the traits that delineated top from bottom performers. The trait identification feature of the system allowed the system to provide career development advice by quantitatively comparing an individual employee's profile to a model employee profile for the company's position and then reporting on the employee's strengths and areas that need improvement.

Figure 2:
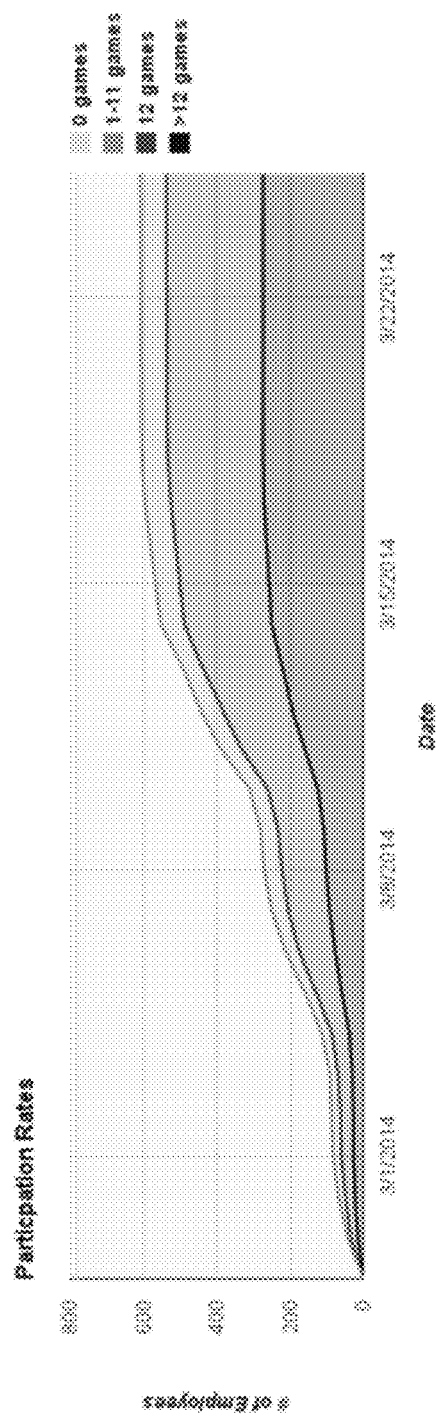
FIG. 2 is a graphical representation of employee participation in an example of the invention.

Details concerning the number of employees who participated across time at select intervals are listed in TABLE 6 and represented in FIG. 2. The final group size for top performers from each of the four employee positions is detailed in TABLE 7.

TABLE 6

| Games Completed | Day 4 | Day 11 | Day 18 | Day 25 | Day 28 |
|---|---|---|---|---|---|
| 0 | 699 | 511 | 230 | 175 | 173 |
| 1-11 | 23 | 49 | 64 | 71 | 71 |
| 12 | 33 | 120 | 238 | 263 | 265 |
| More than 12 | 27 | 102 | 250 | 273 | 273 |
| Total | 782 | 782 | 782 | 782 | 782 |

TABLE 7

| Employee Position | Employees classified as top performers by a system of the invention |
|---|---|
| Position 1 | 24 |
| Position 2 | 37 |

TABLE 7-continued

| Employee Position | Employees classified as top performers by a system of the invention |
|---|---|
| Position 3 | 30 |
| Position 4 | 30 |
| Total | 121 |

The model accuracy was determined as follows: Correct Classification/Total N, where N was the group size and the correct classification of the employee was determined by the overlap of group classification between the system and the company.

Figure 3:
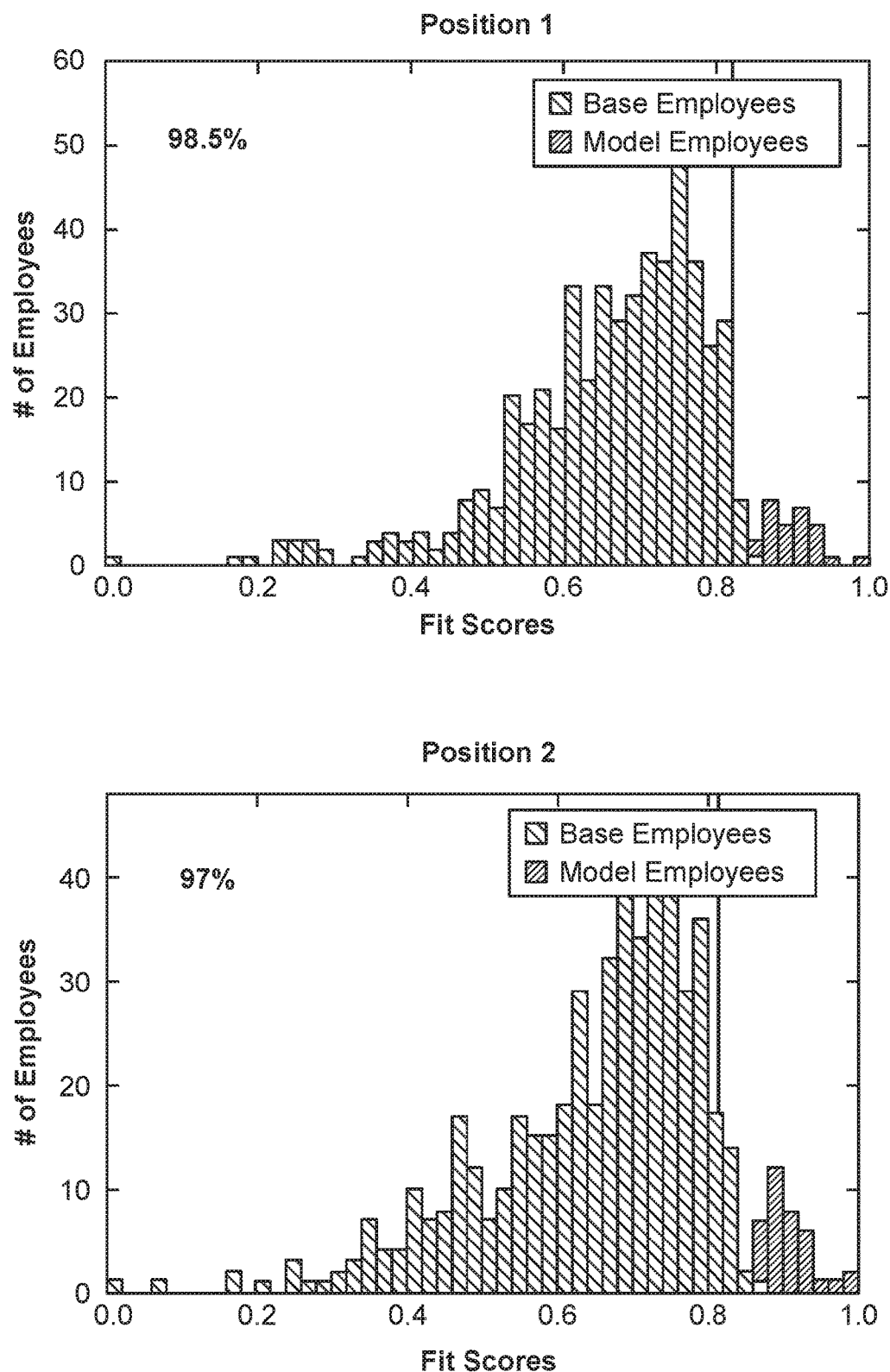
FIG. 3 shows the accuracy of models generated by a system of the invention.
Figure 3:
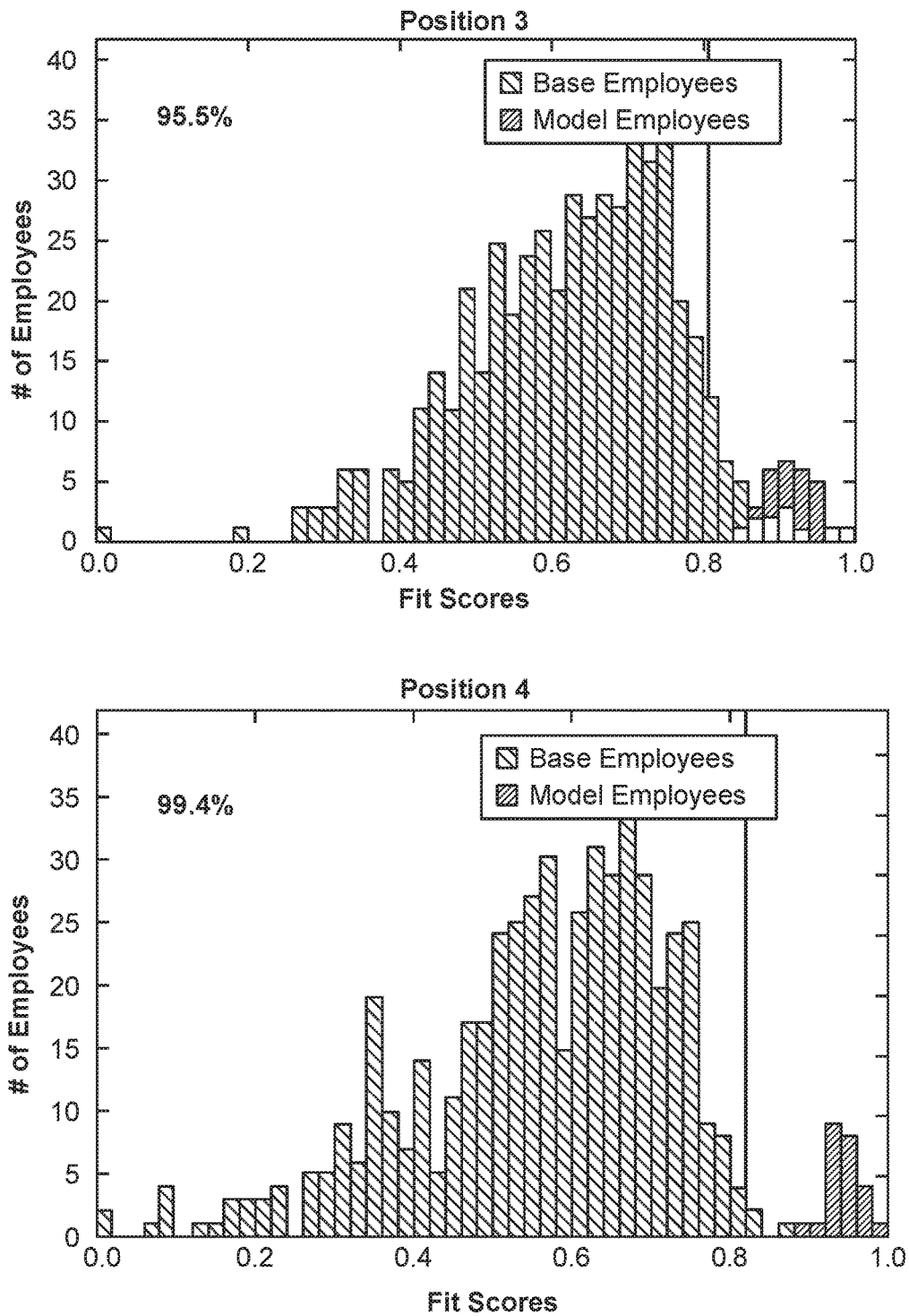

Model accuracy results, based on the training data, for the four positions examined were all greater than 95% as shown in FIG. 3. FIG. 3 depicts a set of 4 histograms, one for each position modeled, and each histogram displays the number of employees on the Y-axis and fit scores on the X-axis. Employees in dark gray whose fit scores were less than 0.8 were accurately classified according to the invention's metrics as not being top performers. Employees depicted in light gray whose fit scores were greater than or equal to 0.8 were accurately classified by the invention as being top performers. Employees depicted in dark gray whose fit scores were greater than or equal to 0.8 were inaccurately classified as top performers (false positives), while those depicted in light gray whose scores were less than 0.8 were inaccurately classified as not being top performers (false negatives). False positives and false negatives were described in section [00115] and depicted in TABLE 2. Company B received a profile analysis by trait for each of the four models built by the system. These profiles suggested traits characteristic of a model employee for a specific position.

The system also provided Company B's employees with career development feedback. The system specifically provided each employee with a list of the top three traits that make the employee an ideal fit for their position, and a list of the top three traits upon which the employee could improve. In addition, the system provided recommendations as to how the employee could improve for each trait.

The system classified employees as top performers or bottom performers across four different sales positions with greater than 95% accuracy. The system was available for re-staffing at Company B because Company B was interested in utilizing the results from the system to help transfer employees between departments, if necessary. Furthermore, employees received career development feedback that was directly based on the assessment. The system's assessment specifically identified the traits of successful employees in a position at the company. The system then gave feedback to the bottom-performing employees about how the employee compared to the model employee, and ways that the bottom-performing employee can improve performance.

Example 21: Use of a System of the Invention to Increase the Conversion Rate of Temporary Employees Company C and Company D were consulting firms that recruited heavily from major business schools for summer associates. In 2012 and 2013, Company C employed 57 MBA summer associates, while Company D employed 106 student summer associates. A system of the invention assessed students that the companies interviewed over the course of two summers and determined whether the system's algorithms could accurately identify students who would continue in the consulting field better than the company could identify those students. The system built culture fit models from students who worked at Company C and Company D, regardless of the position held. The goal of the study was to increase the conversion rate of summer associates to full-time employees.

Following the summer associate program, Company C extended eight offers, and six of those individuals continued to work in the consulting industry after finishing school. Company D extended 16 offers, and 11 of those individuals continued to work in the consulting industry after school ended. The system built models for both Company C and Company D and generated fit scores to predict to whom the companies should extend offers. The system suggested that Company C extend offers to 11 students, 10 of whom continued to work in the consulting industry. The system also suggested that Company D extend offers to 10 individuals, 9 of whom continued to work in the consulting industry (TABLE 8).

TABLE 8

| Company | Offers | Offers Accepted | Acceptance Rate | Combined Acceptance Rate |
|---|---|---|---|---|
| Company C | 8 | 6 | 75% | 71% |
| Company D | 16 | 11 | 70% | |
| System C | 10 | 9 | 90% | 90% |
| System D | 11 | 10 | 91% | |

Example 22: Use of a System of the Invention to Increase Yield of Applicant Acceptance of Offers Company C worked with 57 summer associates over 2012 and 2013. Company C extended offers to 13 of the associates. Ten of the 13 associates accepted the offer from Company C. Company C asked the system to test whether the algorithms could predict who was more likely to accept an offer from a firm. Using the model previously built for Company C in EXAMPLE 21, the system compared average fit scores for those individuals who accepted an offer from the company to fit scores of those individuals who rejected an offer from the company.

The average fit score of the ten summer associates who accepted a full-time offer from Company C was 69%. The average fit score of the three individuals who did not accept an offer from Company C was 35%. Thus, the system's fit scores can track individuals who are more likely to accept an offer from a company. For Company C, individuals who accepted Company C's offer had higher culture fit scores than those individuals who rejected Company C's offer.

Example 23: Assessment of Adverse Impact in a System of the Invention

The fit scores created by a system of the invention can be an aggregation of the scores of the individual assessments that are part of the system. A multivariate statistical analysis of the fit scores was done to evaluate the impact of demographic factors on the scores. To investigate the impact of age on the system's scores, two age groups from the population (N=179), 39-years-old and younger and 40-years-old and older, were analyzed. The Hotelling's T-squared test was used to assess any statistically significant difference between the age groups. A difference in the groups based on age was not observed. The impact of age was further analyzed by breaking down the population into four age groups: a) 29-years-old and younger b) 30-34 c) 35-39, and d) 40-years-old or older. A multivariate one-way ANOVA test was employed, which also showed no differences among age groups (p>0.05). Using the same data set and a Hotelling's T-squared test, the variation between females and males was not statistically significant (p>0.05). In a multivariate ANOVA test, no significant differences were observed across the race categories (p>>0.1), which included Asian, Black, Hispanic, Middle Eastern, Native American, White, other, and mixed race.

The multivariate statistical analyses demonstrated that none of age, gender, and race was statistically significantly related to the fit scores.

The system can examine the tests for adverse impact by testing for bias in each individual test for differences in results based on age, race, or gender. Results on the system's tests were examined at the individual assessment level. The system examined each task for differences by age, gender, or race groups and the analysis included between one and ten separate measures for each task. Significant results from the statistical analysis are given in TABLE 9. None of the tasks showed differences by race, and a subset of the tasks showed differences based on age and gender. For those tasks that showed significant differences between groups, the effect size of those differences was reported. A correlation coefficient (r) for the effect size of 0.1 can be considered small; 0.3 can be considered moderate; and 0.5 can be considered large. Sixteen of 17 significant results fell in the small to moderate range, and a single measure from the Tower of London task (time per correct move) achieved an r of 0.32, in the moderate range.

TABLE 9

| Task | Results by Age, Gender, or Race | Effect size, r (p) |
|---|---|---|
| Analogical Reasoning | No difference by Age, p > 0.14 | ns |
| | No difference in Gender, p > 0.06 | ns |
| | No difference in Race, p > 0.85 | ns |
| Balloon Analogue Risk Task | No difference by Age, p's > .17 | ns |
| | Risk Taking differed by Gender, $F(1, 331) = 6.02$, $p = 0.01$ | −0.18 (<.001) |
| | No difference by Race, p's > 0.38 | ns |
| Choice Task | Percentage Gamble differed by Age, $F(1, 345) = 8.25$, $p = 0.004$ | −0.16 (0.003) |
| | Percentage Gamble differed by Gender, $F(1, 344) = 6.77$, $p = 0.009$ | −0.14 (0.01) |
| | No difference by Race, p = 0.80 | ns |
| Dictator Task | No difference by Age, p's > 0.06 | ns |
| | Amount 2 differed by Gender, $F(1, 338) = 3.91$, $p < 0.05$ | −0.11 (0.05) |
| | No difference by Race, p's > 0.28 | ns |
| Digit Span | No differences by Age, p = 0.54 | ns |
| | No difference by Gender, p = 0.15 | ns |
| | No difference by Race, p = 0.74 | ns |
| EEfRT | No difference by Age, p's > 0.11 | ns |
| | Med-High Slope differed by Gender, $F(1, 336) = 6.89$, $p = 0.009$ | 0.14 (0.009) |
| | No difference by Race, p's > 0.06 | ns |
| Facial Affect Test | Accuracy differed by Age, $F(1, 334) = 12.70$, $p < 0.001$ | 0.19 (<0.001) |
| | No difference by Gender, p's > 0.12 | ns |
| | No difference by Race, p's > 0.24 | ns |
| Finger Tapping | Reaction Time differed by Age, $F(1, 342) = 12.12$, $p < 0.001$ | 0.20 (<0.001) |
| | Reaction Time differed by Gender, $F(1, 340) = 21.33$, $p < 0.001$ | −0.25 (<.001) |
| | No difference by Race, p's > 0.99 | ns |
| Flanker Task | No difference by Age, p's > 0.07 | ns |
| | All Switching, Accuracy differed by Gender, $F(1, 284) = 6.71$, $p = 0.01$ | 0.15 (0.01) |
| | No difference by Race, p's > 0.19 | ns |
| Future Discounting | Discount Rate differed by Age, $F(1, 330) = 4.07$, $p = .04$ | 0.14 (0.008) |
| | Discount Rate differed by Gender, $F(1, 330) = 6.24$, $p = 0.01$ | −0.25 (<.001) |
| | No difference by Race, p > 0.79 | ns |
| Go/No-Go | No difference by Age, p's > 0.59 | ns |
| | No difference by Gender, p's > 0.17 | ns |
| | No difference by Race, p's > 0.78 | ns |
| Mind in the Eyes | No difference by Age, p > 0.44 | ns |
| | No difference by Gender, p > 0.60 | ns |
| | No difference by Race, p > 0.85 | ns |
| N-Back | No difference by Age, p = 0.23 | ns |
| | Accuracy differed by Gender, $F(1, 332) = 9.65$, $p = 0.002$ | 0.17 (0.002) |
| | No difference by Race, p > 0.48 | ns |
| Pattern Recognition | No difference by Age, p = 0.12 | ns |
| | Number Correct differed by Gender, $F(1, 338) = 9.13$, $p = 0.003$ | 0.16 (0.003) |
| | No difference by Race, p > 0.34 | ns |

TABLE 9-continued

| Task | Results by Age, Gender, or Race | Effect size, r (p) |
|---|---|---|
| Reward Learning Task | No difference by Age, p's > 0.41 | ns |
| | No difference by Gender, p's > 0.13 | ns |
| | No difference by Race, p's > 0.18 | ns |
| Tower of London | Time per correct move differed by Age, F(1, 335) = 39.83, p < 0.001 | 0.32 (<0.001) |
| | No difference by Gender, p's > 0.64 | ns |
| | No difference by Race, p's > 0.24 | ns |
| Trust Task | No difference by Age, p's > 0.12 | ns |
| | Amount differed by Gender, F(1, 344) = 10.17, p = 0.001 | 0.17 (0.002) |
| | Fairness differed by Gender, F(1, 344) = 7.84, p = 0.005 | −0.15 (0.006) |
| | No difference by Race, p's > 0.06 | ns |
| N-Back | No difference by Age, p = .23 | ns |
| | Accuracy differed by Gender, F(1, 332) = 9.65, p = 0.002 | 0.17 (0.002) |
| | No difference by Race, p > 0.48 | ns |

Balloon Analogue Risk Task (BART)

One measure of the BART showed a significant difference between genders; specifically, women were more risk-averse than men. This difference represented 3% of the observed variance explained by gender.

Choice Task

The results differed by both age and gender for the Choice Task. Younger participants had higher percentage gamble scores than participants over the age of 40. This difference represented 2.6% of the variance for the sample. Examination of percentage gamble by gender revealed that men had higher scores than women, and this difference represented 1.96% of the variance for the sample.

Dictator Task

The amount of money given to the random participant differed by gender, and women gave more in the task than men. This difference represented 1.2% of the variance for the sample.

EEfRT

The inflection point after which the more difficult task was chosen more frequently differed by gender, and men had higher scores than women. The gender difference explained 1.96% of variance in the data.

Facial Affect Test

The results for the Facial Affect Test differed by age in that older participants were more accurate in identifying emotions from facial expressions than were younger participants. The age difference explained 3.61% of the variance in the data.

Finger Tapping Task

The reaction time for Finger Tapping Task differed by both age and gender. Older participants were slower on the reaction time measure than younger participants, and women were slower than men. These effects accounted for 4 and 6.25% of variance in the data, respectively.

Flanker Task

One measure of the Flanker Task showed a significant difference between men and women. Men scored higher on switching accuracy, and this difference accounted for 2.25% of variance in the data.

Future Discounting

The system identified differences by both age and gender in the Future Discounting Task. Older participants were more likely to wait for opportunities in the future than younger participants. This effect accounted for 1.96% of the variance in the data. The discount rate also differed by gender, in that women were more likely than men to wait for opportunities in the future.

N-Back Test

A measure of accuracy in the N-Back Test differed by gender. Men had higher accuracy scores than women, a result that accounted for 2.89% of variance in the data.

Trust Task

The system identified differences in both amount and fairness by gender. Men gave a higher amount than women, an effect that accounted for 2.89% of variance in the data. Women gave higher fairness ratings, an effect that accounted for 2.25% of variance in the data.

Pattern Recognition

The system identified a significant difference based on gender in the Pattern Recognition Task. Men had higher pattern recognition scores than women, an effect that accounted for 2.56% of variance in the data.

Towers of London

The system identified a significant effect of age in the Towers of London Task. Older participants took more time per correct move than younger participants, an effect that accounted for 10.24% of variance.

Example 24: Fit Score Examination

The system examined sample data for evidence of adverse impact present within the fit scores the system generated for a sample from Company B. TABLE 10 reports the sample demographics, including a breakdown of the sample by position.

The system tested for adverse impact on the total sample (N=464) for each position. 514 employees from Company B across 4 positions completed the battery of tests. Individual models were built by the system for each position from a total sample of 538 employees. The system had gender data on 464 of the 538 employees. No difference in fit scores was found between genders within a position, or across positions.

TABLE 10

| Position | N | Males | Females | p-value for adverse impact |
|---|---|---|---|---|
| Position 1 | 29 | 12 | 17 | 0.41 |
| Position 2 | 280 | 154 | 126 | 0.79 |

TABLE 10-continued

| Position | N | Males | Females | p-value for adverse impact |
|---|---|---|---|---|
| Position 3 | 127 | 53 | 74 | 0.13 |
| Position 4 | 28 | 14 | 14 | 0.89 |
| Total | 464 | 233 | 231 | All >0.2 |

The system did not have access to ethnicity data for the employees of Company B reported above. However, the system tested a sample from an internal database for bias in ethnicity using the models generated above. The system generated fit scores for a sample of 962 individual from an internal database (TABLE 11). The population consisted of a mixture of undergraduate students, MBA students, and industry professionals.

TABLE 11

| Ethnicity | N |
|---|---|
| Caucasian | 513 |
| Asian | 312 |
| African American | 52 |
| Hispanic/Latino | 85 |
| Total | 962 |

A difference in fit scores between ethnicities was not observed for the sample reported in TABLE 12 (TABLE 12).

TABLE 12

| Position | $F^a$-statistic | p-value |
|---|---|---|
| Position 1 | 0.59 | 0.62 |
| Position 2 | 1.85 | 0.14 |
| Position 3 | 2.52 | 0.06 |
| Position 4 | 2.45 | 0.06 |

$^a$One-way ANOVA.

Example 25: Fit Score Examination: Industry Fit Models

The system further examined all of the system's industry models for gender and ethnicity bias. The system generated fit scores for a sample of 962 individuals from an internal database (TABLES 11 and 13). The population consisted of a mixture of undergraduate students, MBA students, and industry professionals. A bias in gender or ethnicity was not observed in any of the industry models the system considers stable (TABLE 14).

TABLE 13

| Gender | N |
|---|---|
| Male | 496 |
| Female | 496 |
| Total | 962 |

TABLE 14

| Model | Group | t-statistic (gender) or F-statistic (ethnicity) | p-value |
|---|---|---|---|
| Consulting | Gender | 0.88 | 0.35 |
| Consulting | Ethnicity | 1.55 | 0.20 |
| Education | Gender | 1.05 | 0.31 |
| Education | Ethnicity | 0.62 | 0.60 |
| Entertainment | Gender | 0.34 | 0.56 |
| Entertainment | Ethnicity | 1.34 | 0.26 |
| Entrepreneurship | Gender | 2.05 | 0.15 |
| Entrepreneurship | Ethnicity | 0.64 | 0.59 |
| Finance | Gender | 0.14 | 0.70 |
| Finance | Ethnicity | 0.50 | 0.69 |
| Healthcare | Gender | 0.62 | 0.43 |
| Healthcare | Ethnicity | 1.04 | 0.37 |
| Marketing | Gender | 0.14 | 0.70 |
| Marketing | Ethnicity | 1.80 | 0.15 |
| Product Development | Gender | 3.23 | 0.07 |
| Product Development | Ethnicity | 0.59 | 0.62 |
| Project Management | Gender | 0.86 | 0.35 |
| Project Management | Ethnicity | 2.31 | 0.07 |
| Retail | Gender | 0.49 | 0.48 |
| Retail | Ethnicity | 1.35 | 0.26 |
| Hedge Fund | Gender | 2.41 | 0.12 |
| Hedge Fund | Ethnicity | 1.85 | 0.14 |
| Investment Management | Gender | 0.15 | 0.70 |
| Investment Management | Ethnicity | 1.66 | 0.17 |
| Private Equity | Gender | 0.14 | 0.71 |
| Private Equity | Ethnicity | 1.70 | 0.16 |
| Venture Capital | Gender | 0.30 | 0.58 |
| Venture Capital | Ethnicity | 1.88 | 0.13 |
| Investment Banking | Gender | 1.64 | 0.20 |
| Investment Banking | Ethnicity | 1.19 | 0.31 |

Example 26: Computer Architectures

Figure 4:
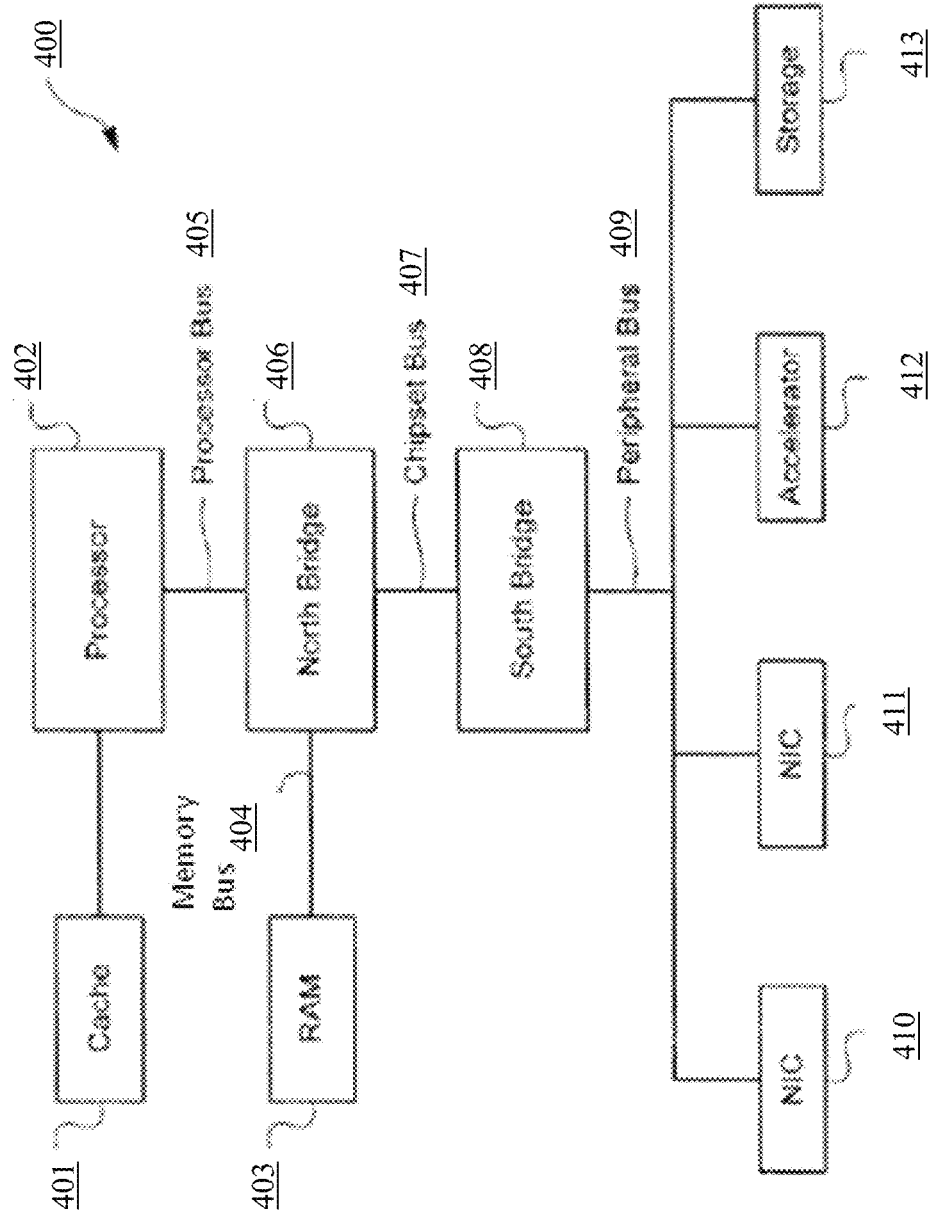
FIG. 4 is a block diagram illustrating a first example architecture of a computer system that can be used in connection with example embodiments of the present invention.

Various computer architectures are suitable for use with the invention. FIG. 4 is a block diagram illustrating a first example architecture of a computer system 400 that can be used in connection with example embodiments of the present invention. As depicted in FIG. 4, the example computer system can include a processor 402 for processing instructions. Non-limiting examples of processors include: Intel Core i7™ processor, Intel Core i5™ processor, Intel Core i3™ processor, Intel Xeon™ processor, AMD Opteron™ processor, Samsung 32-bit RISC ARM 1176JZ(F)-S v1.0™ processor, ARM Cortex-A8 Samsung S5PC100™ processor, ARM Cortex-A8 Apple A4™ processor, Marvell PXA 930™ processor, or a functionally-equivalent processor. Multiple threads of execution can be used for parallel processing. In some embodiments, multiple processors or processors with multiple cores can be used, whether in a single computer system, in a cluster, or distributed across systems over a network comprising a plurality of computers, cell phones, and/or personal data assistant devices.

Data Acquisition, Processing and Storage.

As illustrated in FIG. 4, a high speed cache 401 can be connected to, or incorporated in, the processor 402 to provide a high speed memory for instructions or data that have been recently, or are frequently, used by processor 402. The processor 402 is connected to a north bridge 406 by a processor bus 405. The north bridge 406 is connected to random access memory (RAM) 403 by a memory bus 404 and manages access to the RAM 403 by the processor 402. The north bridge 406 is also connected to a south bridge 408 by a chipset bus 407. The south bridge 408 is, in turn, connected to a peripheral bus 409. The peripheral bus can be, for example, PCI, PCI-X, PCI Express, or other peripheral bus. The north bridge and south bridge are often referred to as a processor chipset and manage data transfer between the processor, RAM, and peripheral components on the peripheral bus 409. In some architectures, the functionality of the north bridge can be incorporated into the processor instead of using a separate north bridge chip.

In some embodiments, system 400 can include an accelerator card 412 attached to the peripheral bus 409. The accelerator can include field programmable gate arrays (FPGAs) or other hardware for accelerating certain processing.

Software Interface(s).

Software and data are stored in external storage 413 and can be loaded into RAM 403 and/or cache 401 for use by the processor. The system 400 includes an operating system for managing system resources; non-limiting examples of operating systems include: Linux, Windows™, MACOS™, BlackBerry OS™, iOS™, and other functionally-equivalent operating systems, as well as application software running on top of the operating system.

In this example, system 400 also includes network interface cards (NICs) 410 and 411 connected to the peripheral bus for providing network interfaces to external storage, such as Network Attached Storage (NAS) and other computer systems that can be used for distributed parallel processing.

Computer Systems.

Figure 5:
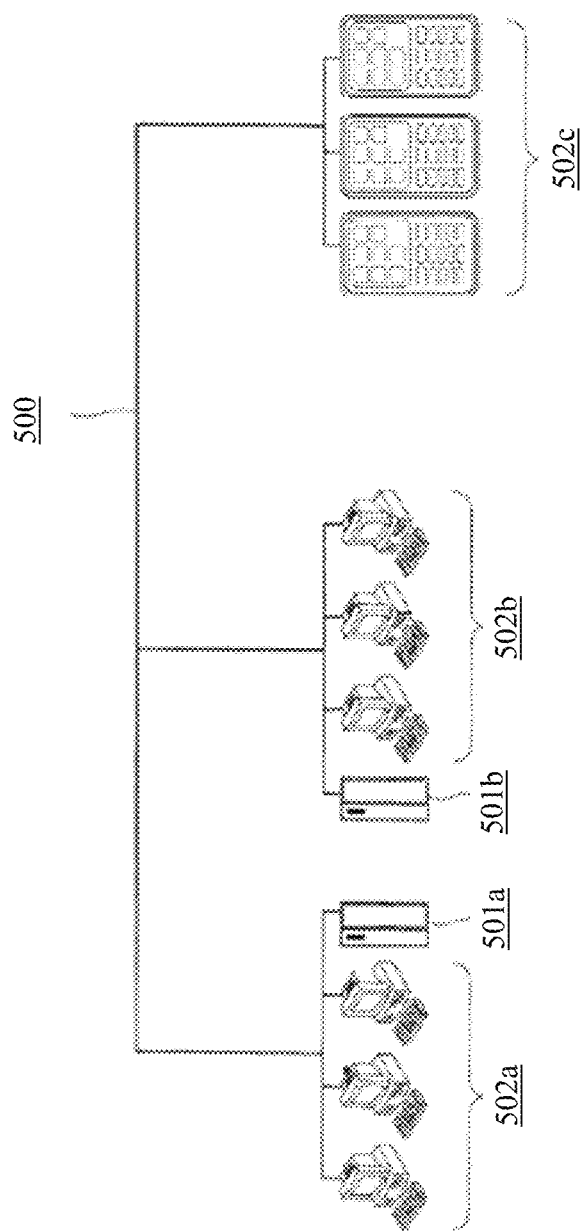
FIG. 5 is a diagram illustrating a computer network that can be used in connection with example embodiments of the present invention.

FIG. 5 is a diagram showing a network 500 with a plurality of computer systems 502a, and 502b, a plurality of cell phones and personal data assistants 502c, and Network Attached Storage (NAS) 501a, and 501b. In some embodiments, systems 502a, 502b, and 502c can manage data storage and optimize data access for data stored in Network Attached Storage (NAS) 501a and 502b. A mathematical model can be used for the data and be evaluated using distributed parallel processing across computer systems 502a, and 502b, and cell phone and personal data assistant systems 502c. Computer systems 502a, and 502b, and cell phone and personal data assistant systems 502c can also provide parallel processing for adaptive data restructuring of the data stored in Network Attached Storage (NAS) 501a and 501b. FIG. 5 illustrates an example only, and a wide variety of other computer architectures and systems can be used in conjunction with the various embodiments of the present invention. For example, a blade server can be used to provide parallel processing. Processor blades can be connected through a back plane to provide parallel processing. Storage can also be connected to the back plane or as Network Attached Storage (NAS) through a separate network interface.

In some embodiments, processors can maintain separate memory spaces and transmit data through network interfaces, back plane, or other connectors for parallel processing by other processors. In some embodiments, some or all of the processors can use a shared virtual address memory space.

Virtual Systems.

Figure 6:
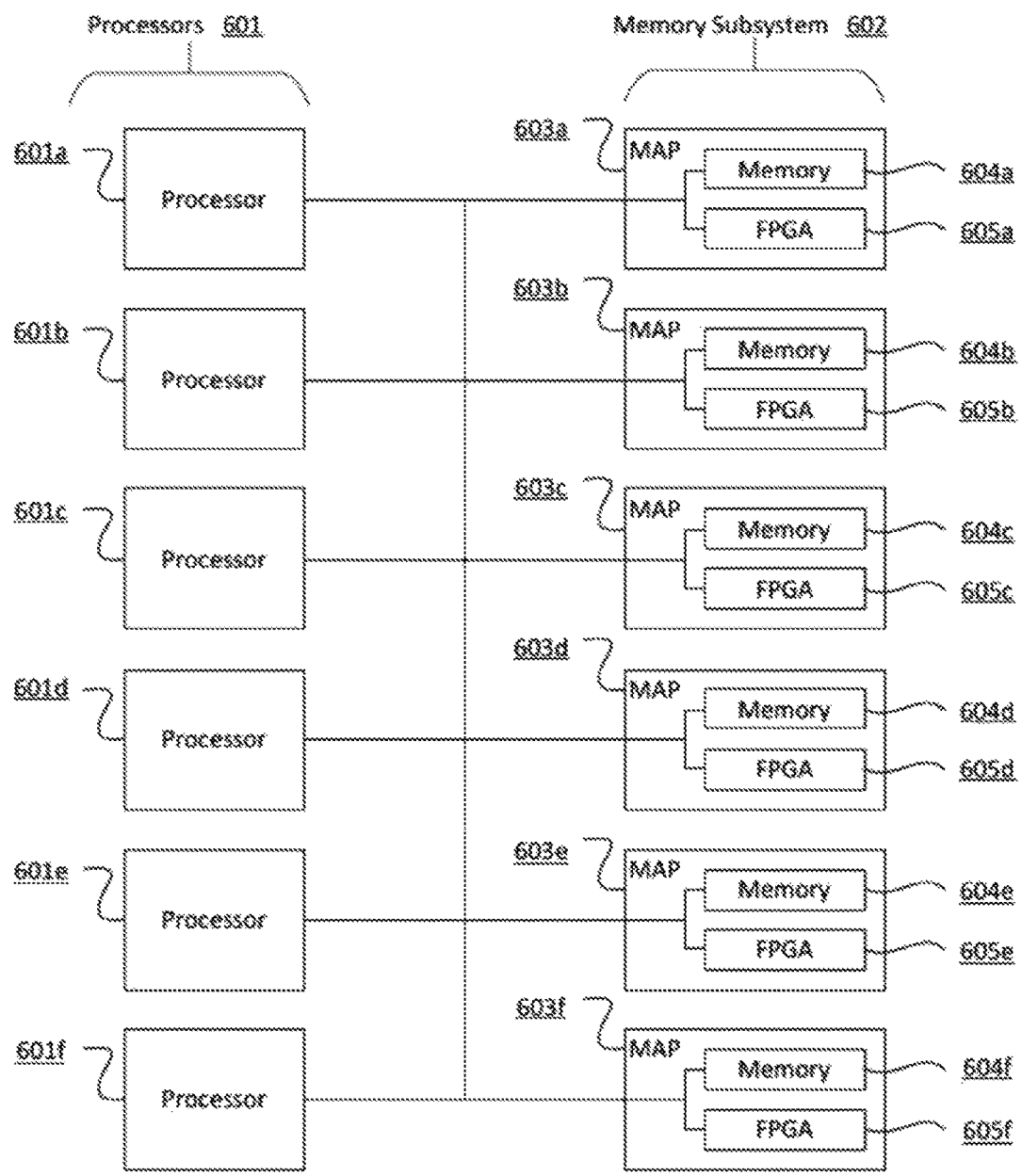
FIG. 6 is a block diagram illustrating a second example architecture of a computer system that can be used in connection with example embodiments of the present invention.

FIG. 6 is a block diagram of a multiprocessor computer system using a shared virtual address memory space. The system includes a plurality of processors 601a-f that can access a shared memory subsystem 602. The system incorporates a plurality of programmable hardware memory algorithm processors (MAPs) 603a-f in the memory subsystem 602. Each MAP 603a-f can comprise a memory 604a-f and one or more field programmable gate arrays (FPGAs) 605a-f. The MAP provides a configurable functional unit and particular algorithms or portions of algorithms can be provided to the FPGAs 605a-f for processing in close coordination with a respective processor. In this example, each MAP is globally accessible by all of the processors for these purposes. In one configuration, each MAP can use Direct Memory Access (DMA) to access an associated memory 604a-f, allowing it to execute tasks independently of, and asynchronously from, the respective microprocessor 601a-f. In this configuration, a MAP can feed results directly to another MAP for pipelining and parallel execution of algorithms.

The above computer architectures and systems are examples only, and a wide variety of other computer, cell phone, and personal data assistant architectures and systems can be used in connection with example embodiments, including systems using any combination of general processors, co-processors, FPGAs and other programmable logic devices, system on chips (SOCs), application specific integrated circuits (ASICs), and other processing and logic elements. Any variety of data storage media can be used in connection with example embodiments, including random access memory, hard drives, flash memory, tape drives, disk arrays, Network Attached Storage (NAS) and other local or distributed data storage devices and systems.

In example embodiments, the computer system can be implemented using software modules executing on any of the above or other computer architectures and systems. In other embodiments, the functions of the system can be implemented partially or completely in firmware, programmable logic devices such as field programmable gate arrays (FPGAs) as referenced in FIG. 6, system on chips (SOCs), application specific integrated circuits (ASICs), or other processing and logic elements. For example, the Set Processor and Optimizer can be implemented with hardware acceleration through the use of a hardware accelerator card, such as accelerator card 412 illustrated in FIG. 4.

Figure 7:
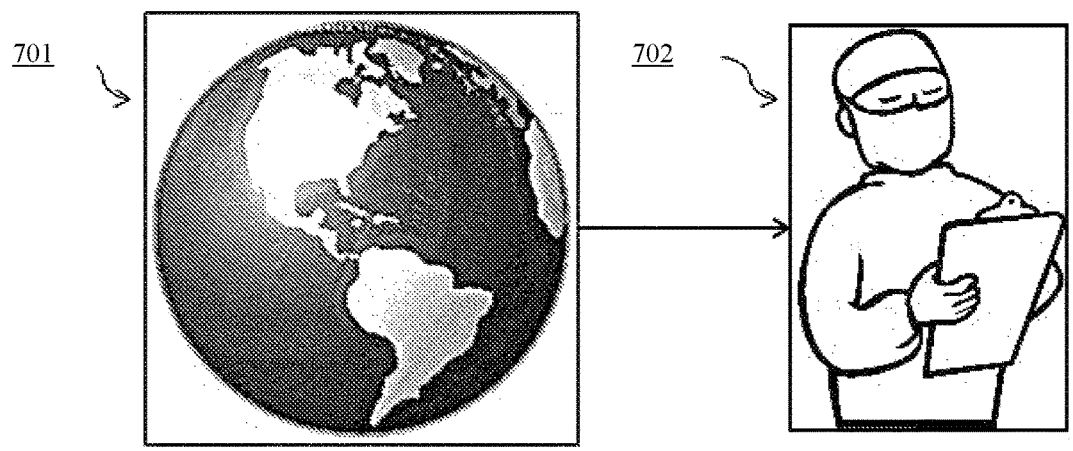
FIG. 7 illustrates a global network that can transmit a product of the invention.

Any embodiment of the invention described herein can be, for example, produced and transmitted by a user within the same geographical location. A product of the invention can be, for example, produced and/or transmitted from a geographic location in one country and a user of the invention can be present in a different country. In some embodiments, the data accessed by a system of the invention is a computer program product that can be transmitted from one of a plurality of geographic locations 701 to a user 702 (FIG. 7). Data generated by a computer program product of the invention can be transmitted back and forth among a plurality of geographic locations, for example, by a network, a secure network, an insecure network, an internet, or an intranet. In some embodiments, an ontological hierarchy provided by the invention is encoded on a physical and tangible product.

EMBODIMENTS

The following non-limiting embodiments provide illustrative examples of the invention, but do not limit the scope of the invention.

Embodiment 1

A computer program product comprising a computer-readable medium having computer-executable code encoded therein, the computer-executable code adapted to be executed to implement a method comprising: a) providing a recruitment system, wherein the recruitment system comprises: i) a task module; ii) a measurement module; iii) an assessment module; and iv) an identification module; b) providing by the task module a computerized task to a subject; c) measuring by the measurement module a performance value demonstrated by the subject in performance of the task; d) assessing by the assessment module a trait of the subject based on the measured performance value; and e) identifying to a hiring officer by the identification module based on the assessed trait that the subject is suitable for hiring by an entity.

Embodiment 2

The computer program product of embodiment 1, wherein the recruitment system further comprises a profile module, wherein the method further comprises creating by the profile module a profile for the subject based on the assessment of the trait of the subject.

Embodiment 3

The computer program product of any one of embodiments 1-2, wherein the recruitment system further comprises a model module, a reference model, and a comparison module, and wherein the method further comprises generating by the model module a model of the subject based on the assessment of more than one trait of the subject, wherein the method further comprises comparing by the comparison module the model of the subject and the reference model.

Embodiment 4

The computer program product of any one of embodiments 1-2, wherein the recruitment system further comprises a model module and a comparison module, and wherein the method further comprises generating by the model module a model of the subject based on the assessment of more than one trait of the subject, wherein the method further comprises comparing by the comparison module the model of the subject and a database of test subjects.

Embodiment 5

The computer program product of embodiment 4, wherein the test subjects work for the entity.

Embodiment 6

The computer program product of any one of embodiments 1-5, wherein the hiring officer works for the entity.

Embodiment 7

The computer program product of embodiment 4, wherein the recruitment system further comprises an aggregation module, wherein the method further comprises collecting by the aggregation module data from the subject and aggregating the data from the subject into the database of the test subjects.

Embodiment 8

The computer program product of embodiment 3, wherein the recruitment system further comprises a scoring module, wherein the method further comprises scoring by the scoring module the subject based on the comparison of the model of the subject and the reference model.

Embodiment 9

The computer program product of embodiment 4, wherein the recruitment system further comprises a scoring module, wherein the method further comprises scoring by the scoring module the subject based on the comparison of the model of the subject with the database of test subjects.

Embodiment 10

A computer program product comprising a computer-readable medium having computer-executable code encoded therein, the computer-executable code adapted to be executed to implement a method comprising: a) providing a talent identification system, wherein the talent identification system comprises: i) a task module; ii) a measurement module; iii) an assessment module; iv) an identification module; and v) an output module; b) providing by the task module a computerized task to a subject; c) measuring by the measurement module a performance value demonstrated by the subject in performance of a task; d) assessing by the assessment module a trait of the subject based on the measured performance value; e) identifying by the identification module a career propensity based on the assessing of the trait of subject; and f) outputting by the output module the identified career propensity to a hiring officer.

Embodiment 11

The computer program product of embodiment 10, wherein the talent identification system further comprises a recommendation module, wherein the method further comprises recommending by the recommendation module a career based on the career propensity of the subject.

Embodiment 12

The computer program product of any one of embodiments 10-11, wherein the talent identification system further comprises a model module, a reference model, and a comparison module, and wherein the method further comprises generating by the model module a model of the subject based on the assessment of more than one trait of the subject, wherein the method further comprises comparing by the comparison module the model of the subject and the reference model.

Embodiment 13

The computer program product of any one of embodiments 10-11, wherein the talent identification system further comprises a model module and a comparison module, and wherein the method further comprises generating by the model module a model of the subject based on the assessment of more than one trait of the subject, wherein the method further comprises comparing by the comparison module the model of the subject and a database of test subjects.

Embodiment 14

A method comprising: a) providing a computerized task to a subject; b) measuring a performance value demonstrated by the subject in performance of the task; c) assessing a trait of the subject based on the performance value; d) comparing by a processor of a computer system the trait of the subject with a database of test subjects; e) determining based on the comparing that the subject is suitable for hiring by an entity; and f) reporting to a hiring officer at the entity that the subject is suitable for hiring.

Embodiment 15

The method of embodiment 14, further comprising creating a profile for the subject based on the assessing of the trait of the subject.

Embodiment 16

The method of any one of embodiments 14-15, further comprising generating a model of the subject based on the comparison of more than one trait of the subject with the database of test subjects.

Embodiment 17

The method of embodiment 16, further comprising scoring the subject based on the model of the subject.

Embodiment 18

The method of any one of embodiments 14-17, wherein the assessed trait is a cognitive trait.

Embodiment 19

The method of any one of embodiments 14-18, wherein the assessed trait is an emotional trait.

Embodiment 20

The method of any one of embodiments 14-19, wherein the test subjects work for the entity.

Embodiment 21

The method of any one of embodiments 14-20, wherein the computerized task has an acceptable level of reliability as determined by a test-retest assessment.

Embodiment 22

The method of any one of embodiments 14-21, wherein the computerized task has an acceptable level of reliability as determined by a split-half reliability assessment.

Embodiment 23

A method comprising: a) providing a computerized task to a subject; b) measuring a performance value demonstrated by the subject in performance of the task; c) assessing a trait of the subject based on the performance value; d) identifying by a processor of a computer system a career propensity of the subject based on a comparison of the assessed trait of the subject with a database of test subjects; and e) outputting a result of the comparison to a hiring officer.

Embodiment 24

The method of embodiment 23, further comprising creating a profile for the subject based on the assessing of the trait of the subject.

Embodiment 25

The method of any one of embodiments 23-24, further comprising generating a model for the subject based on comparing more than one trait of the subject with the database of test subjects.

Embodiment 26

The method of any one of embodiments 23-25, further comprising recommending to the subject a career based on the subject's career propensity.

Embodiment 27

The method of any one of embodiments 23-26, wherein the computerized task has an acceptable level of reliability as determined by a test-retest assessment.

Embodiment 28

The method of any one of embodiments 23-27, wherein the computerized task has an acceptable level of reliability as determined by a split-half reliability assessment.

Embodiment 29

The method of any one of embodiments 23-28, wherein the assessed trait is a cognitive trait.

Embodiment 30

The method of any one of embodiments 23-29, wherein the assessed trait is an emotional trait.

What is claimed:

1. A computer-implemented game-based personnel recruitment method that assesses a prospective candidate for a job position based upon a set of predetermined traits of a select group of participants from an entity, the method comprising:

providing interactive media on a plurality of computing devices having input/output (I/O) devices connected thereto for a plurality of participants, wherein the interactive media comprises a recruiting game calling for the performance of a series of computerized tasks that are designed to measure a plurality of different types of traits of the plurality of participants consisting of emotional, cognitive and personality traits, and wherein the recruiting game includes a predefined set of graphical visual objects that are configured to be manipulated by the plurality of participants using the I/O devices to enable the participants to individually perform the series of computerized tasks in the recruiting game;

receiving model input data from the computing devices when the plurality of participants play the recruiting game on the graphical displays of the computing devices by manipulating a graphical visual object on the graphical displays using the I/O devices to perform the series of computerized tasks, wherein the graphical visual object is configured to dynamically change in shape or size in response to the individualized manipulation of the graphical visual object by each participant of the plurality of participants; and analyzing the model input data derived from the manipulation of the graphical visual object within the recruiting game by each participant of the plurality of participants to: (1) extract measurements of the different types of traits exhibited by each participant when the plurality of participants individually performs the series of computerized tasks in the recruiting game, (2) correlate the different types of traits measured across the series of computerized tasks between the plurality of participants, and (3) generate a reference model from the correlation of the different types of measured traits, wherein the reference model is based on the measured traits of the select group of participants selected from the plurality of participants;

displaying the recruiting game including the plurality of predefined set of graphical visual objects visually on a graphical display of the computing device to the prospective candidate; and generating comparative input data from the prospective candidate playing the recruiting game on the graphical display of the computing device by manipulating a graphical visual object using an I/O device connected thereto in order to enable the prospective candidate to perform the series of computerized tasks in the recruiting game, wherein the comparative input data is compared against the reference model to determine the prospective candidate's suitability for the job position offered by the entity.

2. The method of claim 1, wherein the comparative input data is compared against the reference model to determine a fit score of the candidate, and wherein the fit score is indicative of a level of match of the prospective candidate with the select group of participants.

3. The method of claim 2, further comprising: comparing the prospective candidate's fit score to a predetermined threshold, wherein the predetermined threshold is used as a decision boundary for determining the prospective candidate's suitability for the job position offered by the entity.

4. The method of claim 3, further comprising: determining that the prospective candidate is in-group and substantially similar to the select group of participants when the prospective candidate's fit score is above the predetermined threshold.

5. The method of claim 4, further comprising: determining that the prospective candidate is out-of-group and substantially different from the select group of participants when the prospective candidate's fit score is below the predetermined threshold.

6. The method of claim 1, wherein the plurality of participants are employed by the entity, wherein the select group of participants correspond to a group of employees of the entity who at least meet a set of job-performance metrics that are predefined by the entity, and wherein the reference model is further correlated with the set of job-performance metrics.

7. The method of claim 1, wherein the plurality of different types of traits of the participants and the prospective candidate are measured over a course of the recruiting game, by evaluating the participants' and the prospective candidate's manipulation of one or more graphical visual objects on the graphical displays of the computing devices to perform the series of computerized tasks in the recruiting game.

8. The method of claim 1, wherein the manipulation of the graphical visual objects is effected by the participants and the prospective candidate selecting the graphical visual object on the graphical displays using the I/O devices to perform the series of computerized tasks.

9. The method of claim 1, wherein the manipulation of the graphical visual object is effected by the participants and the prospective candidate spatially manipulating the graphical visual objects on the graphical displays using the I/O devices to perform the series of computerized tasks.

10. The method of claim 1, wherein the manipulation of the graphical visual object is effected by the participants and the prospective candidate entering alphanumeric text via the graphical visual object on the graphical displays using the I/O devices to perform the series of computerized tasks.

11. The method of claim 1, wherein the I/O devices comprise a mouse, a keyboard, and/or a touchscreen monitor, and wherein at least one of the I/O devices is used by the participants and the prospective candidate to control the degree of manipulation of the graphical visual objects on the graphical displays.

12. The method of claim 1, wherein the predefined set of graphical visual objects are displayed on the graphical displays in a plurality of different colors.

13. The method of claim 1, wherein the predefined set of graphical visual objects comprises (1) computer-generated virtual images and/or (2) digital photographs of real people and objects.

14. The method of claim 1, wherein the plurality of different types of traits of the participants and the prospective candidate are measured based on the participants' and the prospective candidate's speed, accuracy, and/or judgment in performing the series of computerized tasks.

15. The method of claim 1, wherein the recruiting game is configured to allow the plurality of participants to interact with one another via one or more graphical visual objects on the graphical displays, in order to perform the series of computerized tasks.

16. The method of claim 1, wherein different reference models are generated for a plurality of different fields, functions, industries and/or entities.

17. The method of claim 1, wherein the participants and the prospective candidate play the recruiting game on the graphical displays of the computing devices by manipulating one or more graphical visual objects on the graphical displays through multiple rounds of the game to perform the series of computerized tasks.

18. A system to assess a prospective candidate for a job position based upon a set of predetermined traits of a select group of participants from an entity, the system comprising:

a server in communication with a plurality of computing devices having input/output (I/O) devices connected thereto, wherein the server comprises a memory for storing interactive media and a set of software instructions, and one or more processors configured to execute the set of software instructions to:

provide the interactive media on the computing devices for a plurality of participants, wherein the interactive media comprises a recruiting game calling for the performance of a series of computerized tasks that are designed to measure a plurality of different types of traits of the plurality of participants consisting of emotional, cognitive and personality traits, and wherein the recruiting game includes a predefined set of graphical visual objects that are configured to be manipulated by the plurality of participants using the I/O devices to enable the participants to individually perform the series of computerized tasks in the recruiting game;

receive model input data from the computing devices when the plurality of participants play the recruiting game on graphical displays of the computing devices by manipulating a graphical visual object on the graphical displays using the I/O devices to perform the series of computerized tasks, wherein the graphical visual object is configured to dynamically change in shape or size in response to the individualized manipulation of the graphical visual object by each participant of the plurality of participants; and analyze the model input data derived from the manipulation of the graphical visual object within the recruiting game by each participant of the plurality of participants to: (1) extract measurements of the different types of traits exhibited by each participant when the plurality of participants individually performs the series of computerized tasks in the recruiting game, (2) correlate the different types of traits measured across the series of computerized tasks between the plurality of participants, and (3) generate a reference model from the correlation of the different types of measured traits, wherein the reference model is based on the measured traits of the select group of participants selected from the plurality of participants; and wherein one or more of the plurality of computing devices is configured to:

receive the interactive media from the server;

display the recruiting game including the plurality of predefined sets of graphical visual objects visually on a graphical display of the computing device to the prospective candidate; and generate comparative input data from the prospective candidate playing the recruiting game on the graphical display of the computing device by manipulating a graphical visual object using an I/O device connected thereto in order to enable the prospective candidate to perform the series of computerized tasks in the recruiting game, wherein the comparative input data is compared against the reference model to determine the prospective candidate's suitability for the job position offered by the entity.

19. A non-transitory computer readable medium storing instructions that, when executed by one or more servers, causes the one or more servers to perform a computer-implemented game-based personnel recruitment method that assesses a prospective candidate for a job position based upon a set of predetermined traits of a select group of participants from an entity, the method comprising:

providing interactive media on a plurality of computing devices having input/output (I/O) devices connected thereto for a plurality of participants, wherein the interactive media comprises a recruiting game calling for the performance of a series of computerized tasks that are designed to measure a plurality of different types of traits of the plurality of participants consisting of emotional, cognitive and personality traits, and wherein the recruiting game includes a predefined set of graphical visual objects that are configured to be manipulated by the plurality of participants using the I/O devices to enable the participants to individually perform the series of computerized tasks in the recruiting game;

receiving model input data from the computing devices when the plurality of participants play the recruiting game on the graphical displays of the computing devices by manipulating a graphical visual objects on the graphical displays using the I/O devices to perform the series of computerized tasks wherein the graphical visual objects is configured to dynamically change in shape or size in response to the individualized manipulation of the graphical visual objects by each participant of the plurality of participants;

analyzing the model input data derived from the manipulation of the graphical visual objects within the recruiting game by each participant of the plurality of participants to: (1) extract measurements of the different types of traits exhibited by each participant when the plurality of participants individually performs the series of computerized tasks in the recruiting game, (2) correlate the different types of traits measured across the series of computerized tasks between the plurality of participants, and (3) generate a reference model from the correlation of the different types of measured traits, wherein the reference model is based on the measured traits of the select group of participants selected from the plurality of participants;

and storing the reference model for use by an entity, wherein the reference model is used as a reference profile against which a prospective candidate's performance in the recruiting game is measured, in order to determine the prospective candidate's suitability for the job position offered by the entity.

* * * * *